US012719560B2

(12) United States Patent
Sohi et al.

(10) Patent No.: US 12,719,560 B2
(45) Date of Patent: Aug. 25, 2026

(54) MANAGING INTERFERENCE FOR COEXISTENCE OF TERRESTRIAL AND NON-TERRESTRIAL WIRELESS NETWORKS

(71) Applicant: Boost SubscriberCo L.L.C., Englewood, CO (US)

(72) Inventors: Gurpreet Sohi, Parker, CO (US); Mehdi Alasti, Reston, VA (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 770 days.

(21) Appl. No.: 18/084,362

(22) Filed: Dec. 19, 2022

(65) Prior Publication Data

US 2024/0204863 A1 Jun. 20, 2024

(51) Int. Cl.
*H04B 7/185* (2006.01)
*H04W 72/542* (2023.01)
*H04W 84/06* (2009.01)

(52) U.S. Cl.
CPC ...... *H04B 7/18513* (2013.01); *H04W 72/542* (2023.01); *H04W 84/06* (2013.01)

(58) Field of Classification Search
CPC ............ H04B 7/18513; H04B 7/18578; H04B 7/1851; H04B 7/18528; H04B 7/185; H04B 17/345; H04B 7/1853; H04B 7/18515; G01S 19/21; G01S 19/258; H04W 84/06
See application file for complete search history.

(56) References Cited

U.S. PATENT DOCUMENTS

| | | | | |
|---|---|---|---|---|
| 5,926,758 | A | 7/1999 | Grybos et al. | |
| 6,157,840 | A | 12/2000 | Hogberg et al. | |
| 10,334,596 | B2 * | 6/2019 | Li | H04W 40/12 |
| 2009/0093213 | A1 | 4/2009 | Miller et al. | |
| 2011/0287775 | A1 * | 11/2011 | Fan | H04W 72/541<br>455/452.1 |

(Continued)

FOREIGN PATENT DOCUMENTS

| | | | |
|---|---|---|---|
| EP | 1035663 | A2 | 9/2000 |
| WO | 96/14696 | A1 | 5/1996 |

OTHER PUBLICATIONS

International Search Report and Written Opinion received for PCT Patent Application No. PCT/US2023/079220, mailed on Mar. 12, 2024, 13 pages.

*Primary Examiner* — Khalid W Shaheed
(74) *Attorney, Agent, or Firm* — Christopher Wickstrom; Frontier IP Law PLLC

(57) ABSTRACT

An example system and method may manage interference to facilitate the coexistence of terrestrial and non-terrestrial wireless networks. An example system may determine frequency bands assigned to adjacent satellites or satellite services and determine an interference characteristic of the frequency bands used by the adjacent satellites. The system may select a frequency band for use by a reference satellite in a reference geographic region based on the frequency bands assigned to the adjacent satellites. In some instances, the system may instruct the reference satellite to use the selected frequency band for communication with a wireless client device in the reference geographic region.

18 Claims, 12 Drawing Sheets

(56) References Cited

U.S. PATENT DOCUMENTS

| | | | | |
|---|---|---|---|---|
| 2018/0132108 | A1* | 5/2018 | Taori | H04W 16/10 |
| 2018/0249468 | A1* | 8/2018 | Erceg | H04W 72/541 |
| 2019/0028182 | A1* | 1/2019 | Smyth | H04W 24/08 |
| 2019/0239082 | A1* | 8/2019 | Ravishankar | H04B 7/18528 |
| 2020/0137678 | A1* | 4/2020 | Katsumata | H04W 24/02 |
| 2021/0311201 | A1* | 10/2021 | Reis | G01S 19/215 |
| 2021/0311203 | A1* | 10/2021 | Reis | G01S 19/21 |
| 2024/0172261 | A1* | 5/2024 | Alasti | H04W 72/0453 |

* cited by examiner

142

NTN DL
522d

Wireless Client Device
106a
NTN NB-IoT UE

NTN DL OOBE
522c

5G NR DL OOBE
522b

Wireless Client Device
106b
5G UE 522a
5G NR DL

516

MANAGING INTERFERENCE FOR COEXISTENCE OF TERRESTRIAL AND NON-TERRESTRIAL WIRELESS NETWORKS

TECHNICAL FIELD

The present disclosure relates to a system for reducing wireless interference for wireless electronic devices, such as mobile devices. Some implementations relate to an adaptable system for reducing interference between various devices in a wireless communications environment in which both terrestrial and non-terrestrial networks are present.

BRIEF SUMMARY

Wireless client devices, such as mobile devices, communicate via a spectrum of various electromagnetic (also referred to as radio herein for simplicity, although it should be noted that microwave or other frequencies may be used) frequencies in which a wireless cellular provider has access to a certain spectrum of usable frequencies that allow communication between the wireless client devices and a network of other devices, for example, provided using servers, cellular towers, and other equipment. For instance, a wireless client device in a cell or area served by a terrestrial cellular tower may be assigned a channel or set of frequencies by the cellular tower for communication with the cellular tower, which relays communications from the wireless client device using the assigned channel.

Non-terrestrial network providers may allow wireless client devices, such as mobile devices, to communicate via satellites, thereby increasing the geographic areas in which the devices can communicate. Satellites may provide communication with cellular (e.g., non-satellite phones) devices using radio frequencies typically reserved for terrestrial cellular networks. This technology allows mobile devices to send messages, such as short messaging service (SMS) text messages, using their built-in cellular radios even while located in remote geographic regions that would be out of a coverage area of cellular towers.

Unfortunately, where multiple antennas (e.g., a terrestrial cellular antenna and a non-terrestrial satellite-based antenna) serve the same geographic area using the same, similar, or adjacent frequencies, in band or out-of-band radio interference can cause issues with the wireless communications and reliability of the network(s). Addressing these issues is further complicated by satellites serving larger geographic regions than cellular towers resulting in potentially many more cellular towers serving the same regions. Accordingly, the relative network environments including signal strengths experienced and used by wireless communications devices can vary wildly within the same region.

Interference can be caused by a number of different factors. A signal transmitted from a satellite may interfere with a signal transmitted by a terrestrial base station, such as a cell tower. For example, where a satellite transmits in frequencies with out-of-band leakage (e.g., where there is frequency shift or an imperfect band-pass filter), in an adjacent or overlapping frequency to a cell tower, wireless client devices may experience interference and, consequently, reliability issues. These issues are even further exacerbated when the signal strengths of the transmitters are similar or if the undesired (e.g., from the wrong device/transmitter) signal is more powerful than the desired signal. For instance, where a wireless client device is far away from a cell tower with which it is communicating, it may receive interference from a satellite, which is transmitting at a high signal power.

Because electromatic frequency spectrum is very limited and expensive, it is desirable to maximize usefulness of available spectrum while reducing interference. Unfortunately, because bandpass filters and radio frequency leakage typically do not allow perfect alignment of channels, system intelligence is desirable in addressing interference while maximizing spectrum efficiency. The technologies described herein intelligently mitigate interference in varying contexts while also allowing the wireless networks to coexist in the same or adjacent spectrum frequencies.

While networks typically attempt to maximize the amount of spectrum assignable to wireless client devices to reduce interference, implementations of the technologies described herein may reduce interference by reducing assignable wireless spectrum/frequencies, such as by establishing static or dynamic spectrum (e.g., physical resource block—“PRB”) blanking ranges. The technology may determine attributes of terrestrial and/or non-terrestrial hardware or signals and use the attributes to increase network utilization and coexistence while reducing interference. For example, the technology may vary spectrum blanking ranges based on wireless client device signal strength, spectrum blocks/bands used by satellites, and other factors. The technology uses the factors to adapt spectrum blanking ranges or otherwise assign channels to client devices in such a way that the spectrum is efficiently used while reducing interference and allowing coexistence of the terrestrial and non-terrestrial wireless networks. Accordingly, the technology may maintain signal-to-noise ratios even in varying environments having various amounts of signal power and interference for terrestrial and non-terrestrial networks, thereby improving network quality for one or both of the terrestrial and non-terrestrial networks while allowing their coexistence and maximizing spectrum efficiency. These and other features and operations are described in further detail throughout this disclosure.

The technology may include an improved wireless scheduler system, which may be configured to perform particular operations or actions by virtue of having software, firmware, hardware, or a combination of them installed on the system that in operation causes or cause the system to perform the actions. One general aspect of the system includes a method that includes: determining one or more frequency bands assigned to one or more adjacent satellites, the one or more adjacent satellites serving one or more adjacent geographic regions to a reference geographic region served by a reference satellite; determining one or more interference characteristics of the one or more frequency bands used by the one or more adjacent satellites; selecting a frequency band for use by the reference satellite in the reference geographic region based on the one or more interference characteristics of the one or more frequency bands assigned to the one or more adjacent satellites, the selected frequency band being selected from a set of available frequency bands for non-terrestrial wireless communication with one or more wireless client devices; and instructing the reference satellite to use the selected frequency band for communication with the one or more wireless client devices in the reference geographic region.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the implementations.

With reference to the figures, reference numbers may be used to refer to example components found in any of the figures, regardless of whether those reference numbers are shown in the figure being described. Further, where a reference number includes a letter referring to one of multiple similar components (e.g., component 000*a*, 000*b*, and 000*n*), the reference number may be used without the letter to refer to one or all of the similar components.

Figure 1:
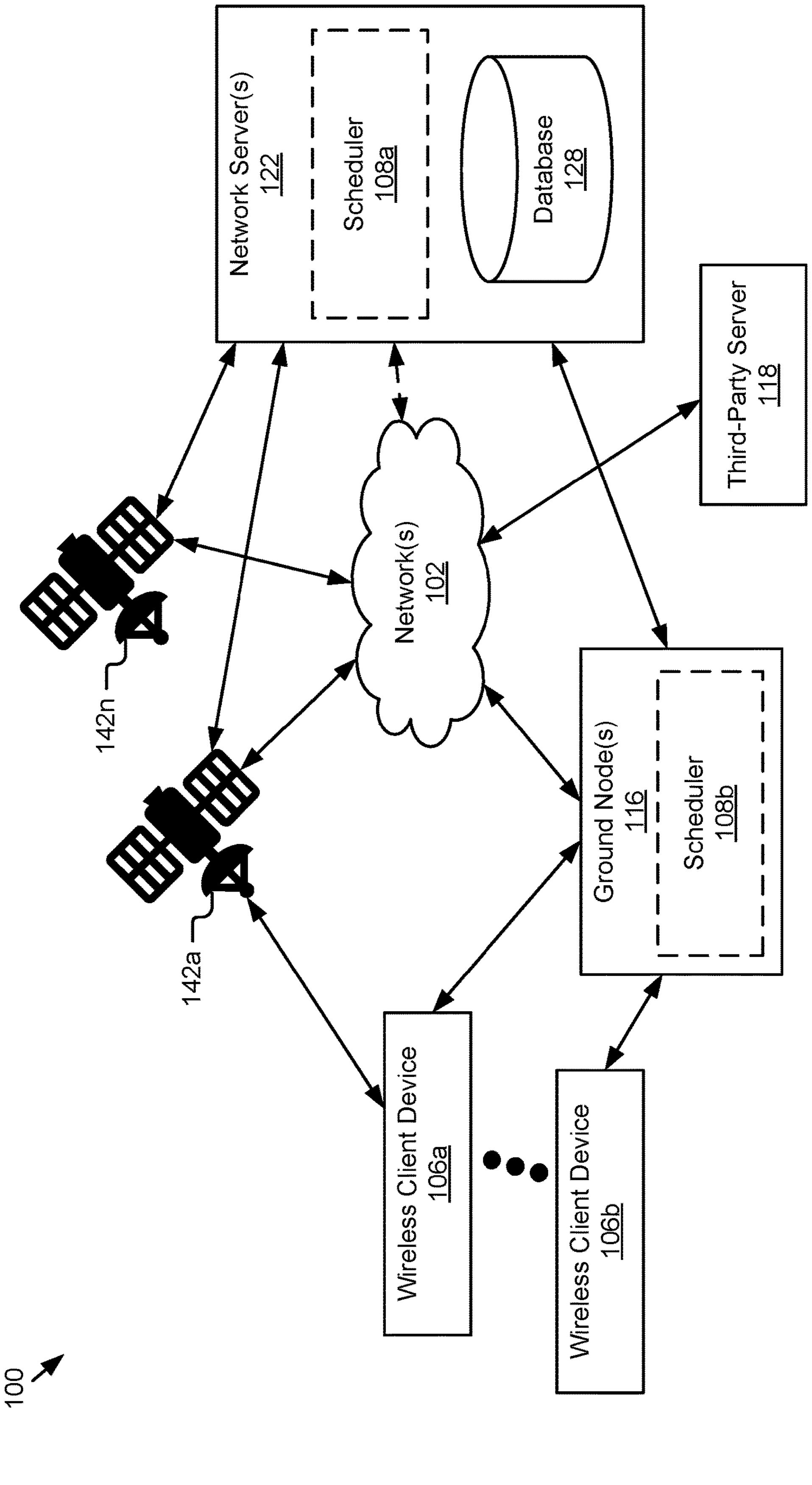
FIG. 1 is a block diagram of an example system for managing interference for coexistence of terrestrial and non-terrestrial wireless networks.

FIG. 1 is a block diagram of an example system 100 for managing interference for coexistence of terrestrial and non-terrestrial wireless networks and other features described throughout this disclosure. The illustrated example system 100 may include one or more wireless client device(s) 106*a* . . . 106*b*, ground node(s) 116, satellite(s) 142*a* . . . 142*n*, a network server 122, and a third-party server 118 (although different configurations and quantities are possible), which may be electronically communicatively coupled via one or more networks 102 for interaction with one another, although other system configurations are possible including other devices, systems, and networks. Before providing additional details regarding the operation and constitution of methods and systems the technology herein, the example environment 100, within which such a system may operate, will briefly be described.

The ground node(s) 116 (e.g., gNB or Next Generation NodeB, or other cell hardware and/or software) may include one or more antennas, masts, amplifiers, broadcast systems, computing systems, filters, power supplies, and/or other devices at or serving one or more cell sites, which provide cellular communication via electromagnetic waves covering a certain geographic area or location, which may be referred to as a cell. For instance, the ground node(s) 116 may be or be part of a terrestrial cellular network provider. It should be noted that a certain cell may be served by a plurality of ground node(s) 116 components, such as multiple antennas, towers, etc. It should also be noted that although the ground node(s) 116 may be fully or partially mounted in a tower or mast, this implementation is provided by way of example and other implementations are possible and contemplated herein. The ground node(s) 116 may include or be communicatively coupled with one or more computing devices or processors that provide instructions to the ground node(s) 116, as described below. For instance, the computing device may run an instance of, portion of, or may interact with a scheduler 108 that performs operations described herein. As noted elsewhere herein, a scheduler 108 may be a base station scheduler associated with a terrestrial network and/or cell tower. For instance, the ground node(s) 116 may, independently or in collaboration with a remote system, such as a network server 122, determine spectrum (e.g., physical resource block—"PRB") blanking ranges, assignable frequencies or channels, assign frequencies or channels, or perform other operations described herein. Although only a single instance of the ground node(s) 116 is illustrated, it should be noted that many instances of the ground node(s) 116 may be used to serve one or more terrestrial cells.

It should be noted that this description refers to a spectrum, frequencies, frequency ranges, bands, blocks, and/or channels. These entities may refer to a single electromagnetic frequency or a range of electromagnetic frequencies. For instance, a wireless spectrum may include a set of bands, physical resource blocks, and or channels, which correspond to one or more frequencies of the spectrum. The bands, ranges, spectra, etc., may additionally or alternatively be defined in terms of threshold frequencies between the bands or ranges.

In some implementations, the system 100 may include one or more satellites or satellite services 142*a* . . . 142*n*, which transmit wireless electromagnetic signals. Satellite services may include wireless signals that are provided by one or more satellites 142 of one or more companies. The satellite(s) 142 may provide wireless communications with one or more wireless client devices 106, such as wireless client device 106*a*, as illustrated. Satellites 142 may be geostationary, in low earth orbit, or orbiting while still performing operations described herein. Where the satellites 142 are orbiting, they may alternate frequencies to use consistent bands in certain geographic regions or the scheduler 108 may adapt to the changing satellite 142 attributes in real or near real time. The satellite 142 and associated signals are described in further detail elsewhere herein.

Multiple satellites 142*a* . . . 142*n* are illustrated to indicate that separate geographic regions may be served by separate satellites 142, that a single satellite 142 may serve multiple geographic regions, and/or that multiple satellites 142 may serve a single geographic region (e.g., where the satellites 142 are not geosynchronous, so they serve a region at different times). As described in reference to FIG. 7, various satellites 142 may be assigned different bands via which to communicate with wireless client devices 106.

The wireless client device(s) 106 (also referred to simply as client devices 106 herein) includes one or more computing devices having data processing and communication capabilities, which may, for instance, include a cellular radio. The client device 106 may couple to and communicate with other client devices 106 and the other entities of the system 100 via the network 102, satellite 142, and/or ground node(s) 116 using a wireless and/or wired connection, such as the network server 122. Examples of client devices 106 may include, but are not limited to, mobile phones, smart phones, wearables, tablets, laptops, desktops with cellular radios, netbooks, server appliances, servers, virtual machines, TVs, or other devices with wireless communication capabilities, etc. The system 100 may include any number of client devices 106, including client devices 106 of the same or different type. As noted elsewhere herein, a wireless client device 106 may transmit messages to a ground node(s) 116, satellite(s) 142, or, potentially, other devices, such as Wi-fi routers, etc. A ground node(s) 116 and/or satellites 142 may, depending on the implementation, assign channels, frequencies, sets of frequencies, or frequency ranges to the wireless client devices 106 for communication. In some instances, the ground node(s) 116 and/or satellites 142 may assign channels or frequencies for communication by the wireless client devices 106 to the satellites 142.

For instance, a first client device 106*a* is illustrated as being communicatively linked with a satellite 142 and a ground node(s) 116. A second client device 106*b* is illustrated as being communicatively linked with a ground node(s) 116, which may be the same or different a ground node(s) 116. In some cases, as described elsewhere herein, the first client device 106*a*, the second client device 106*b*, the ground node(s) 116, and the satellite 142 may each receive and/or transmit wireless signals at one or more frequencies/frequency ranges. The signals from these devices may interfere with each other, as described elsewhere herein.

The scheduler 108 may include specifically designed hardware or computer logic executable by a processor to perform operations described herein. As noted elsewhere herein, the scheduler 108 may be a base station scheduler used by a cell tower or terrestrial network, although other implementations are possible. For example, the scheduler 108 may determine physical resource blocks or frequency bands for use by various satellites 142 serving various geographic regions. The scheduler 108 may determine an arrangement of geographic regions or may assign bands to the corresponding satellites 142, which serve the geographic regions which are in the beam areas of a satellite 142 constellation. The scheduler 108 may determine wireless spectrum blanking blocks, frequencies, or frequency ranges and may assign channels, frequencies, etc., for communication, as describe elsewhere herein. As illustrated, an instance of the scheduler 108*a* may be executed as a web application or backend process on the network server 122, which may issue commands to, or otherwise configure, a ground node(s) 116, a satellite 142, and/or other devices. An instance of the scheduler 108*b* may be executed on a ground node(s) 116, a satellite 142, or an associated control or computing system. It should be noted that although several instances of the scheduler 108 are illustrated as being executed on various devices, the scheduler 108 represents a set of functionalities and may be a distributed system or a remotely hosted service that provides functionalities described herein. Similarly, where multiple schedulers 108 are used, they may be separate or distinct applications with varied logic or functionalities to perform the operations described herein.

There are a variety of systems, components, and network configurations that may also support distributed computing and/or cloud-computing environments within the communication system. For example, computing systems may be connected together within the network 102 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of network 102.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The network server 122 may include a web server, an enterprise application, a scheduler 108, and/or a database 128. It should be noted that the network server 122 may represent multiple physical or virtual devices or servers. In some implementations, the network server 122 may receive data from a third-party server 118, such as location, geographic areas, cell areas, or a wireless network information for a satellite 142, ground node(s) 116, and/or client device 106. The network server 122 may execute a scheduler 108 to process data, determine satellite bands, determine, spectrum blanking regions or blocks, assign frequencies or channels, or perform other operations described herein. For example, the network server 122 may be provided by a terrestrial wireless service provider and/or a non-terrestrial service provider. In some implementations, multiple network servers 122 may be used by a single or multiple communication services providers, for example, to communicate via and/or configure satellites 142 and a ground node(s) 116.

In some implementations, a stakeholder, such as an administrative user, may interact with the scheduler 108 via a client device 106 and/or via an input device of the network server 122 or third-party server 118. For instance, an administrator may provide inputs configuring, modifying, or confirming configurations of bands used by satellites 142, for example, using the techniques described herein. Additionally, or alternatively, the scheduler 108 may perform some or all of the operations described herein automatically and autonomously.

The third-party server 118 may be a server or system, which provides data to a network server 122, scheduler 108, or another device. The third-party server 118 and network server 122 may part of the same system and/or company or may share data via various communication channels. For example, the scheduler 108 may receive or receive data from the third-party server 118, such as satellite 142 location, wireless client device 106 attributes (e.g., wireless radio specifications), wireless client device 106 locations, ground node locations or attributes, or other data, for example, for use in the computations described herein.

In some implementations, a non-terrestrial network provider may use the third-party server 118 to configure bands for use by satellites 142 in communicating with wireless client devices 106. The network server 122 may be used by a terrestrial network provider and may transmit message(s) to the third-party server 118 to configure a satellite. Alternatively, the network server 122 may configure satellite(s) 142 and the third-party server 118 may be used to configure a ground node(s) 116, where the network server 122 provides instructions or data to the third-party server 118 to perform its operations.

The network server 122 and the third-party server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

The database 128 may be stored on one or more information sources for storing and providing access to data, such as the data storage device 208. The database 128 may store data describing client devices 106, satellites 142, ground node(s) 116, bands or channels used by various devices (e.g., a satellite 142, client device 106, or ground node(s) 116, instances of the scheduler 108, available useable and/or guard spectrum bands, physical resource blocks, spectrum blanking ranges or blocks, channels, or other data, such as described herein.

It should be understood that the system 100 illustrated in FIG. 1 is representative of an example system and that a variety of different system environments and configurations are contemplated and are within the scope of the present disclosure. For instance, various acts and/or functionality may be moved from a server to a client (e.g., ground node(s) 116, client device 106, etc.), or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
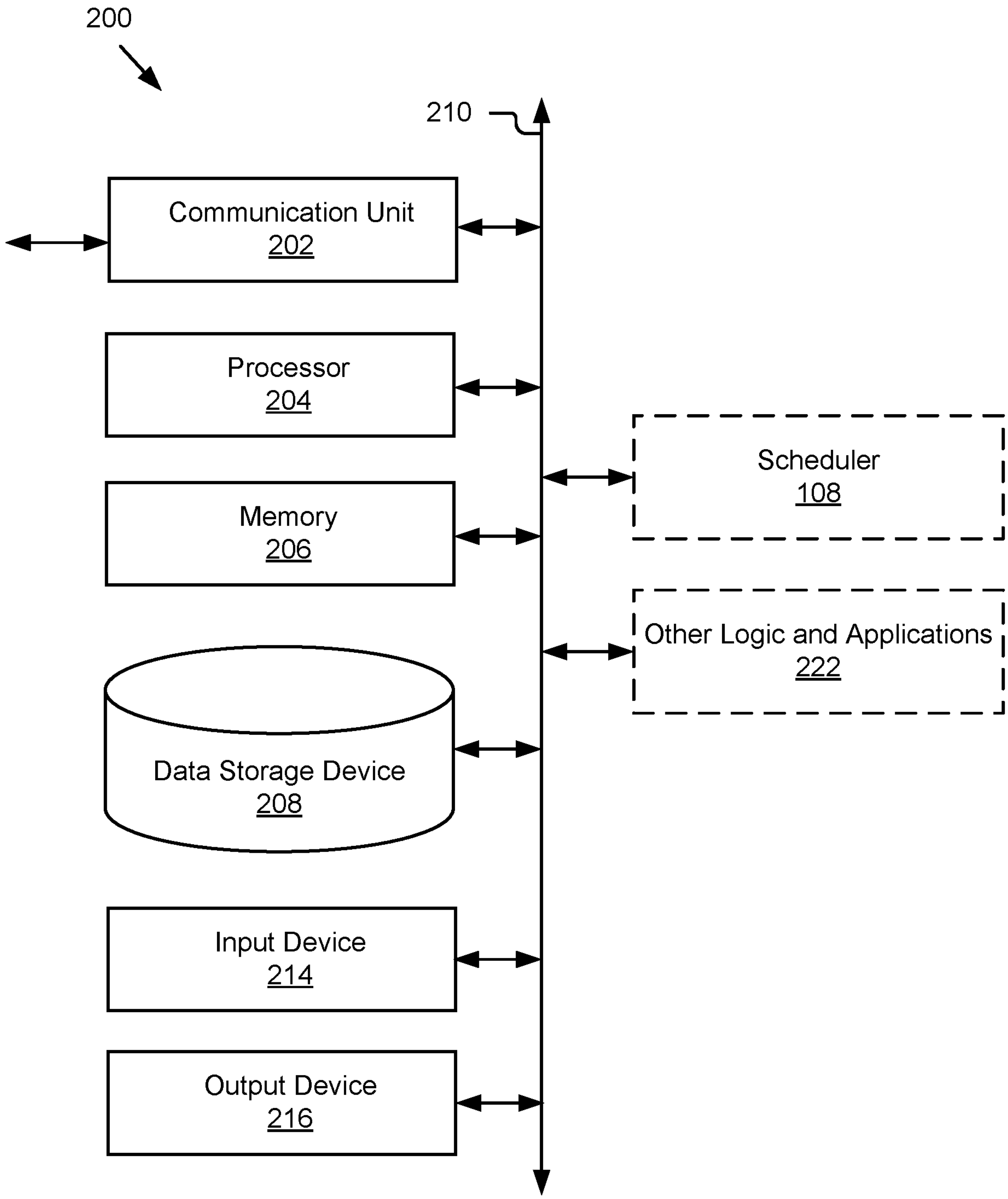
FIG. 2 is a block diagram of an example computing system including computer architecture.

FIG. 2 is a block diagram of an example computing system 200, which may represent the computer architecture of a client device 106, ground node(s) 116, third-party server 118, satellite 142, network server 122, and/or another device described herein, depending on the implementation. In some implementations, as depicted in FIG. 2, the computing system 200 may include a scheduler 108, or another logic and applications 222, depending on the configuration.

The scheduler 108 may include computer logic executable by the processor 204 on various entities of the system 100 via the network 102. In some implementations, the scheduler 108 or its components may be distributed on and/or provide instructions to various components of the system 100.

As depicted, the computing system 200 may include a processor 204, a memory 206, a communication unit 202, an output device 216, an input device 214, and a data storage device 208, which may be communicatively coupled by a communication bus 210. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. The processor 204, memory 206, communication unit 202, etc., are representative of one or more of these components.

The processor 204 may execute software instructions by performing various input, logical, and/or mathematical operations. The processor 204 may have various computing architectures to method data signals (e.g., CISC, RISC, etc.). The processor 204 may be physical and/or virtual, and may include a single core or plurality of processing units and/or cores. In some implementations, the processor 204 may be coupled to the memory 206 via the bus 210 to access data and instructions therefrom and store data therein. The bus 210 may couple the processor 204 to the other components of the computing system 200 including, for example, the memory 206, the communication unit 202, the input device 214, the output device 216, and the data storage device 208.

The memory 206 may store and provide access to data to the other components of the computing system 200. The memory 206 may be included in a single computing device or a plurality of computing devices. In some implementations, the memory 206 may store instructions and/or data that may be executed by the processor 204. For example, the memory 206 may store one or more of the scheduler 108, the other logic and applications 222, and their respective components, depending on the configuration. The memory 206 is also capable of storing other instructions and data, including, for example, an operating system, hardware drivers, other software applications, databases, etc. The memory 206 may be coupled to the bus 210 for communication with the processor 204 and the other components of computing system 200.

The memory 206 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 204. In some implementations, the memory 206 may include one or more of volatile memory and non-volatile memory (e.g., RAM, ROM, hard disk, optical disk, etc.). It should be understood that the memory 206 may be a single device or may include multiple types of devices and configurations.

The bus 210 can include a communication bus for transferring data between components of a computing device or between computing devices, a network bus system including the network 102 or portions thereof, a processor mesh, a combination thereof, etc. In some implementations, the scheduler 108, other logic and applications 222, and various other components operating on the computing system/device 200 (operating systems, device drivers, etc.) may cooperate and communicate via a communication mechanism included in or implemented in association with the bus 210. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of the computing system 200 via the bus 210. The communication unit 202 can provide other connections to the network 102 and to other entities of the system 100 using various standard communication protocols.

In some implementations, the communication unit 202 may include one or more wireless communication devices, such as cellular radios, antennas, satellite 142 dishes, filters, etc., as described elsewhere herein. For instance, where the computing device 200 represents a cellular device, the communication unit 202 may include a cellular radio for communicating via 3G, 4G, LTE (long term evolution), 5G, 6G, etc. Where the computing device 200 represents a ground node(s) 116, the communication unit 202 may include antennas or antenna arrays capable of communicating with one or many wireless devices or satellites 142, in a cell, geographic region, or transmission range. Similarly, where the computing device 200 represents a satellite 142, client device 106, network server 122, or other device, the communication unit 202 may include antennas, antenna arrays, satellite dishes, or other devices capable of communicating with one or many other devices of the system 100, in a cell, geographic region, or transmission range.

The input device 214 may include any device for inputting information into the computing system 200. In some implementations, the input device 214 may include one or more peripheral devices. For example, the input device 214 may include a keyboard, a pointing device, microphone, an image/video capture device (e.g., camera), a touch-screen display integrated with the output device 216, etc. The output device 216 may be any device capable of outputting information from the computing system 200. The output device 216 may include one or more of a display (LCD, OLED, etc.), a printer, a haptic device, audio reproduction device, touch-screen display, a remote computing device, etc. In some implementations, the output device is a display which may display electronic images and data output by a processor of the computing system 200 for presentation to a user, such as the processor 204 or another dedicated processor. In some implementations, the input device 214 may include an optical scanner or sensor, such as a camera that captures images, video, or other data.

The data storage device 208 may include one or more information sources for storing and providing access to data. In some implementations, the data storage device 208 may store data associated with a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 208 may be organized and queried using various criteria including any type of data stored by them, such as in one or more databases (e.g., client device 106 attributes, ground node attributes, satellite 142 attributes, available spectrum, spectrum blanking ranges or blocks, available spectrum ranges, various configurations settings, assignable or assigned channels, etc.), such as described herein. For example, the data storage device 208 may store the database 128. The data storage device 208 may include data tables, databases, or other organized collections of data. Examples of the types of data stored by the data storage device 208 may include, but are not limited to, the data described with respect to the figures, for example.

The data storage device 208 may be included in the computing system 200 or in another computing system and/or storage system distinct from but coupled to or accessible by the computing system 200. The data storage device 208 can include one or more non-transitory computer-readable mediums for storing the data. In some implementations, the data storage device 208 may be incorporated with the memory 206 or may be distinct therefrom.

The components of the computing system 200 may be communicatively coupled by the bus 210 and/or the processor 204 to one another and/or the other components of the computing system 200. In some implementations, the components may include computer logic (e.g., software logic, hardware logic, etc.) executable by the processor 204 to provide their acts and/or functionality. In any of the foregoing implementations, the components may be adapted for cooperation and communication with the processor 204 and the other components of the computing system 200.

It should be noted that while various methods, operations, and features are described herein, other operations, orders, combinations, or features are possible and contemplated. For instance, the operations of FIG. 6 and/or FIG. 9 may represent an extension or additional details to those of FIG. 4 or vice versa. Accordingly, while some or all of the operations or features described herein may be used together, they may be used separately or interchangeably with each other or with other operations or features without departing from the scope of this disclosure.

Figure 3:
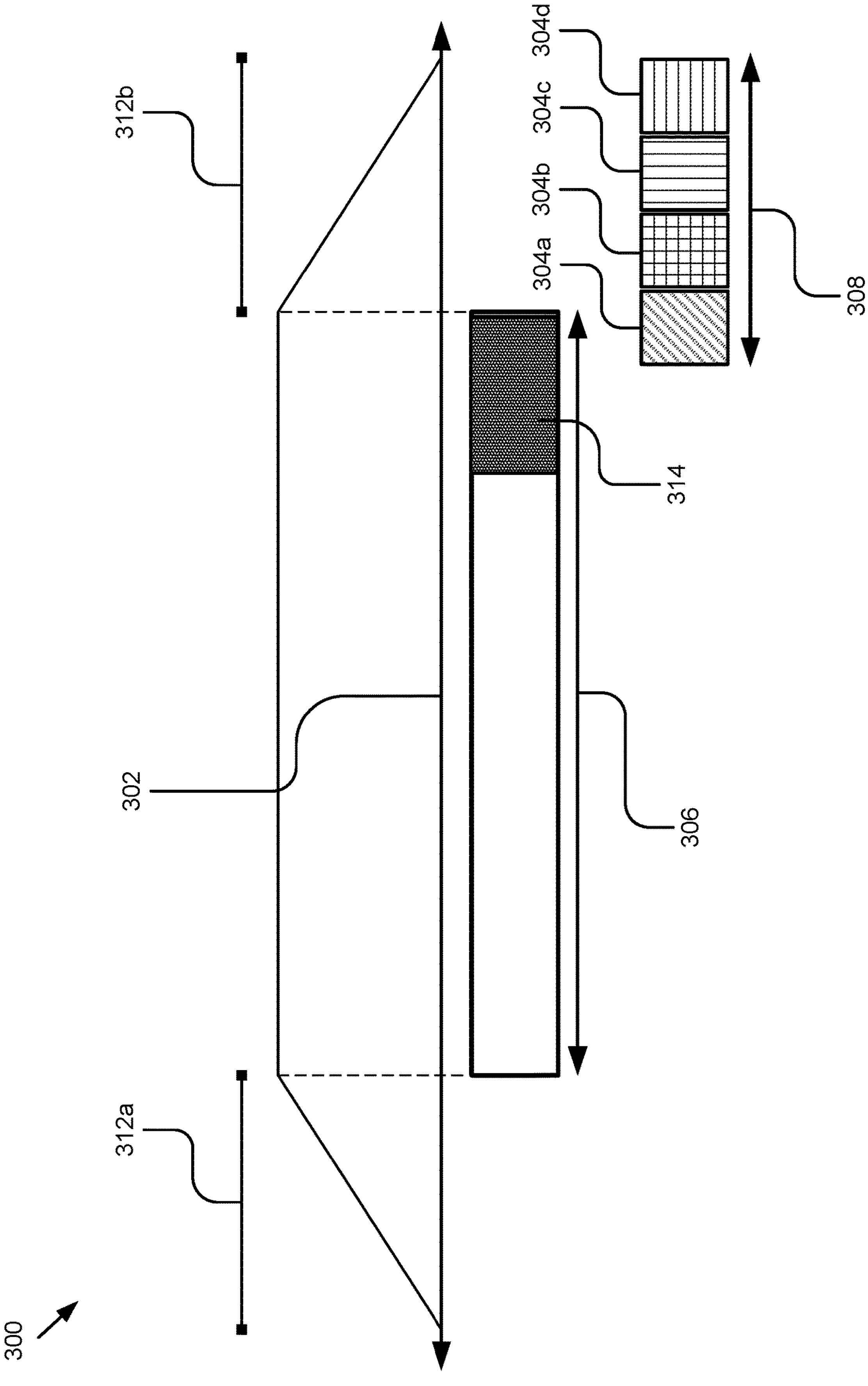
FIG. 3 illustrates a diagram of a wireless spectrum used by wireless client devices, satellites, or ground node(s).

FIG. 3 illustrates a simplified diagram 300 of a wireless spectrum 302 used by wireless client devices 106 (e.g., mobile phones with cellular radios), satellites 142, or a ground node(s) 116. The spectrum 302 may include or be divided into various ranges of frequencies, which may represent bands or channels. In some implementations, a 5G new radio downlink may use a band-pass portion 306 of a spectrum 302 except for a portion (e.g., a higher frequency portion) of the spectrum 302, which may be reserved for other purposes. For instance, the scheduler 108 may blank some physical resource blocks (PRBs), or frequencies on the upper part of the spectrum 302 to avoid interference between a terrestrial signal (e.g., 5G new radio) and a non-terrestrial signal (e.g., a non-terrestrial network narrow band—Internet of Things). For example, a non-terrestrial signal may use all or a portion of the upper guard-band (and, potentially some upper part of the pass-band portion 306). The non-terrestrial channels may use standalone narrowband-IoT (e.g., 200 KHz) and non-orthogonal signals to each other and to the terrestrial (e.g., 5G new radio) signal. Multiple non-terrestrial (e.g., narrowband-IoT) channels/bands could be used to minimize interference and extend the reach of a terrestrial or a non-terrestrial network. It should be noted that, where blanking of some of the guard band 312 and/or pass band 306 is performed, as described below, there may be some inefficiency introduced in the spectrum 302, as only a portion of it may be used for communication with a terrestrial cellular network by a wireless client device 106 (other portions may be used in a non-terrestrial network and/or spectrum blanking). It should be noted that other implementations are possible and contemplated herein.

Wireless operators of terrestrial cellular networks may use satellite 142 operators to support non-terrestrial cellular (e.g., LTE-M or NB-IoT) IoT communications for wireless client devices 106, for example to send SMS text messages or emergency messages in special coverage areas. For instance, a ship may include a wireless client device 106 that may benefit from communication in areas without terrestrial coverage in order to send SMS messages or SOS messages.

As illustrated in the example of FIG. 3, the block 302 may represent an available spectrum (e.g., ranging from lower frequencies at a left end to higher frequencies at a right end) for wireless communications, for example, by a terrestrial cellular provider over 5G or another protocol or band(s). The overall available spectrum 302 may represent a range of frequencies used by a cellular radio of a client device 106 and/or a spectrum owned by a certain wireless network provider.

Depending on the implementation, as illustrated in the example, the terrestrial network may use a pass-band portion 306 of the spectrum 302 for wireless communication (e.g., 5G) and leave one or more bands 304 blank for the non-terrestrial network. For example, a bottom portion of the spectrum 302 may be a lower guard band 312*a* (e.g., a range of frequencies) and an upper portion of the spectrum 302 may be an upper guard band 312*b*. In some implementations, the upper guard band 312*b*, a portion of the upper guard band 312*b*, and/or other parts of the spectrum 302, such as a portion of the pass band 306, may be used/reserved for use by the non-terrestrial network. For instance, one or more bands 304 may be assigned to/reserved for one or more satellites 142 of a non-terrestrial network to provide communications with wireless client devices 106 (e.g., for emergency services, SMS, etc., as noted above). For instance, a satellite control or carrier band 304 may be placed partially or fully in a guard band 312

For example, the available spectrum 302 may include divisions, such as frequency or physical resource blocks or bands 304*a*, 304*b*, 304*c*, and 304*d*, which may be used or reserved for a non-terrestrial network (e.g., provided by a satellite 142). For instance, an individual or set of physical resource block(s) or bands 304 may be used by satellites 142 for communication with client devices 106 having communication capabilities in that frequency. As described in further detail below, each band 304*a* . . . 304*d* may be assigned to a separate satellite 142 and/or geographic region served by a non-terrestrial network.

It should be noted that a physical resource block may be a band, set, or range of frequencies. For purposes of description herein, the term band, channel, or physical resource block may be used interchangeably to refer to one or more frequencies (e.g., a range of frequencies). For instance, a spectrum may be divided into physical resource blocks or bands that may be used by terrestrial (e.g., a cell tower) or non-terrestrial (e.g., a satellite 142) hardware.

As illustrated, four bands 304*a* . . . 304*d* (although other configurations or quantities are possible) are left in the spectrum 302 for use by a non-terrestrial network, which may be in a guard band or a less-used band, although other implementations are possible. For instance, a terrestrial network scheduler (e.g., using the scheduler 108, as described below) may not use/may reserve one or more bands to allow use by a non-terrestrial network. As an example, a band, channel, or physical resource block may be a unit of scheduling in the frequency domain. For instance, spectrum may include twelve subcarriers of 15 kilohertz or 180 kilohertz, four of which may be in a portion 308 of the spectrum provided for use in the non-terrestrial network.

As illustrated, the terrestrial cellular (e.g., 5G wireless) and non-terrestrial (e.g., LTE-M or NB-IoT) networks may use the same or adjacent frequencies or spectrum(s) to maximize spectrum efficiency. In some instances, a wireless operator may use physical resource block, band, or channel spectrum blanking and leave some blocks or frequencies of the spectrum for use by a non-terrestrial network. For instance, a portion of the spectrum 302 is illustrated in the blanked block/range of frequencies 314, which may be blanked or not used by a terrestrial network to provide additional clearance and help maintain signal to noise ratio for wireless communications devices, as described in further detail below. For example, the spectrum blanking may be of frequencies or ranges of frequencies, which may cover discrete channels, bands, or physical resource blocks (e.g., certain identified physical resource blocks may be blanked), although it may additionally or alternatively be determined or defined as a continuous range of frequencies.

Figure 4:
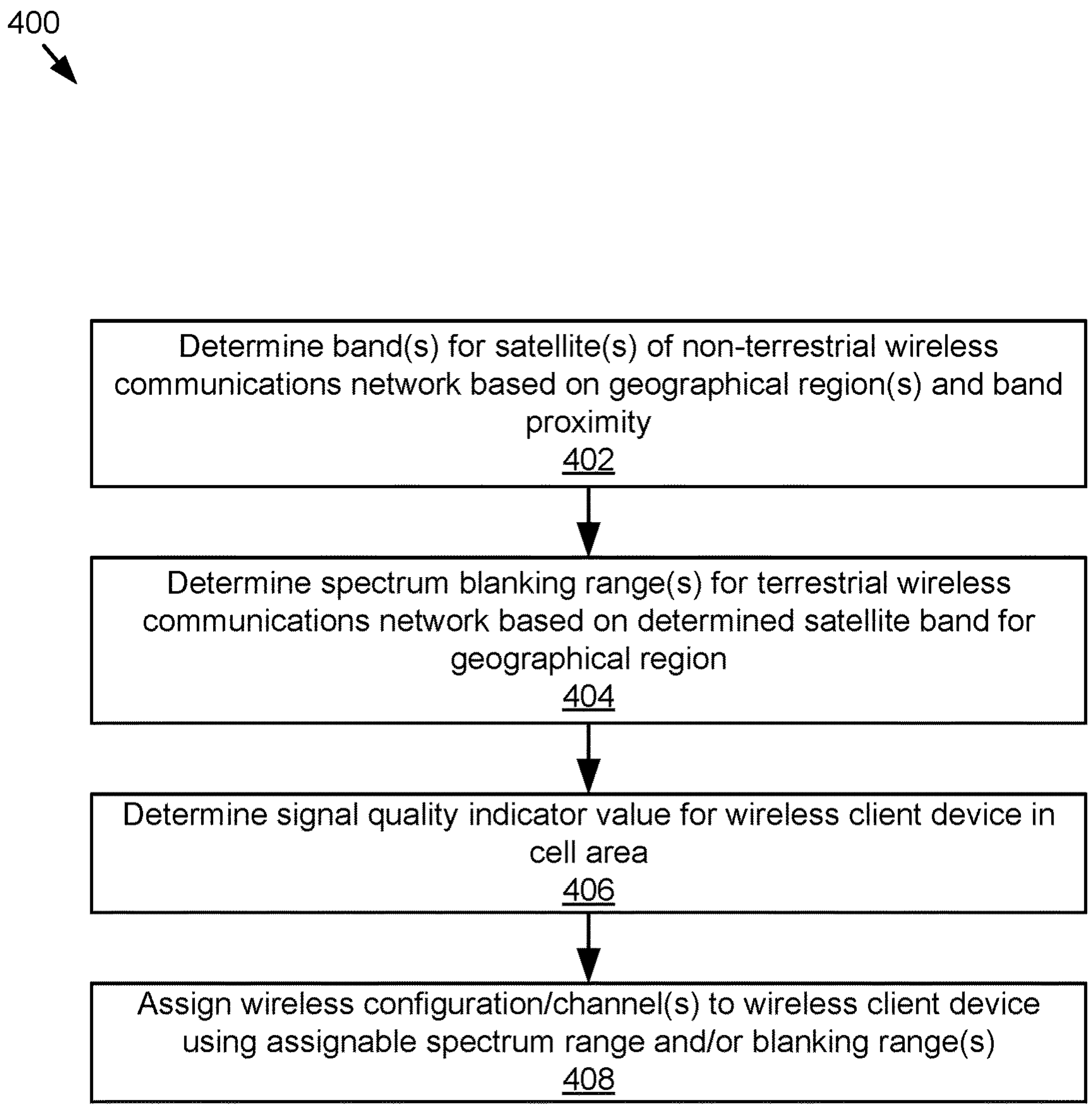
FIG. 4 is a block diagram illustrating an example method for managing interference for coexistence of terrestrial and non-terrestrial wireless networks.

FIG. 4 is a block diagram 400 illustrating an example method for managing interference for coexistence of terrestrial and non-terrestrial wireless networks. It should be noted that the operations provided in the example method may be interchanged, used with other operations or features described herein, or otherwise modified without departing from the scope of this disclosure. For example, operations of the method of the block diagram 400 may be used interchangeably, in different sequences, or using other features described herein, such as those of FIGS. 6 and 9, as well as the other figures herein.

At 402, the scheduler 108 may determine one or more bands for one or more satellites 142 or satellite services of a non-terrestrial wireless network, for example, based on geographic regions served/to-be-served by the satellites 142 and band proximity of bands used/to-be-used by the satellites 142. For example, the bands may be non-overlapping adjacent frequency bands assigned or allocated to satellites and/or satellite services. In some instances, the band(s) may be used for communication between wireless client devices 106 and satellites 142 either simultaneously or separately from the channels used between the wireless client devices 106 and a ground node(s) 116 of a terrestrial network.

In some implementations, the scheduler 108 may determine the location of the ground node(s) 116, such as a cellular antenna of a cell tower, and/or a client device 106, as described above and use the location to determine a band and/or satellite 142 serving a geographic region in which the location is located.

For example, the scheduler 108 may determine frequencies or bands used by a satellite 142 serving the geographic region of the cell served by the ground node(s) 116 and/or the ground node(s) 116. In some implementations, the scheduler 108 may determine a signal received by the ground node(s) 116 from the satellite 142, which identifies the band used by the satellite 142. In some implementations, the scheduler 108 may retrieve data from a database 128, which stores a table outlining satellite 142 attributes, satellite 142 locations, bands used by satellites 142, bands used by a non-terrestrial network in a certain geographic region, and/or non-terrestrial bands associated with a cell/ground node(s) 116, as noted above. For instance, based on the identified location of the cell, the scheduler 108 may retrieve data from the database 128 identifying the band used by the non-terrestrial network in that location, although other implementations are possible.

In some implementations, in or prior to determining the band(s) for the satellite(s), the scheduler 108 may define the band(s) for use by the satellite(s). For instance, a band may be determined and assigned to a satellite 142 based on a geographic arrangement of beams/geographic regions served by one or more satellites 142 in a non-terrestrial network. For example, FIGS. 6 and 7 describe example operations for determining one or more bands for one or more satellites 142, which may be used, for example, in determining spectrum blanking range(s) for a geographic region, cell, and/or certain devices.

At 404, the scheduler 108 may determine one or more spectrum blanking ranges for a terrestrial wireless network based on the determined band used by a satellite 142 in a geographic region. For example, the scheduler 108 may determine frequency ranges of a spectrum, which are reserved from being assigned (or positively designated to be assigned) to a wireless communication device for communication with a ground node(s) 116. For instance, the one or more spectrum blanking ranges may restrict wireless frequencies in the one or more spectrum blanking ranges from being assigned to the one or more wireless client devices 106 for terrestrial wireless communication. As noted elsewhere herein, a spectrum blanking range may provide offset between channels/frequencies assigned by a ground node(s) 116 to a client device 106 from the band(s) used by satellite(s), which reduces interference, for example, for out-of-band emissions between the client device's assigned channel/frequency(ies) and the band of the satellite.

In some implementations, various spectrum blanking ranges may be determined and associated with channel quality information or indicator (also referred to herein as cellular or signal quality indicator) values. For instance, three ranges of signal quality indicator values may be grouped into three buckets, which may correspond to high, medium, and low values. As described below, such as in reference to FIG. 10, the spectrum blanking range or thresholds thereof may be larger or offset by a larger amount for lower signal quality indicator values, while the spectrum blanking range or thresholds may be smaller or offset by a smaller amount for higher signal quality indicator values. Accordingly, the scheduler 108 (e.g., on or in communication with a ground node(s) 116) may have more channels/flexibility to assign channels to wireless client devices 106 with high signal quality indicator values than those with low signal quality indicator values.

In some implementations, as noted below, the spectrum blanking ranges used in a cell may vary based on signal strength of wireless client devices 106 or which band is used in the cell, such as which band/physical resource block a satellite 142 serving a geographic region in which the cell (e.g., a cell area, client device 106, and/or ground node(s)) is located, although other factors and implementations are possible and contemplated herein.

In some implementations, the spectrum blanking range(s) for the wireless client device(s) 106 may be determined based on characteristics, such as interference characteristics, of the non-terrestrial network/satellite's band(s). For instance, the spectrum blanking range(s) may be based on the frequency of the satellite's band (e.g., control band or other physical resource block used by a satellite 142 to communicate with wireless client devices 106) and/or the proximity of the satellite's band to a spectrum or pass band used by a terrestrial cellular network. The offset of the thresholds for the spectrum blanking range(s) from a satellite's band(s) may be based on an expected, determined, or calculated out-of-spectrum emission for a certain satellite, frequency, or other context. For instance, based on programmed values, supervised machine learning (e.g., where interference is tracked across devices and blanking ranges), or otherwise, the scheduler 108 may determine offsets or blanking range sizes, as noted herein.

Figure 9:
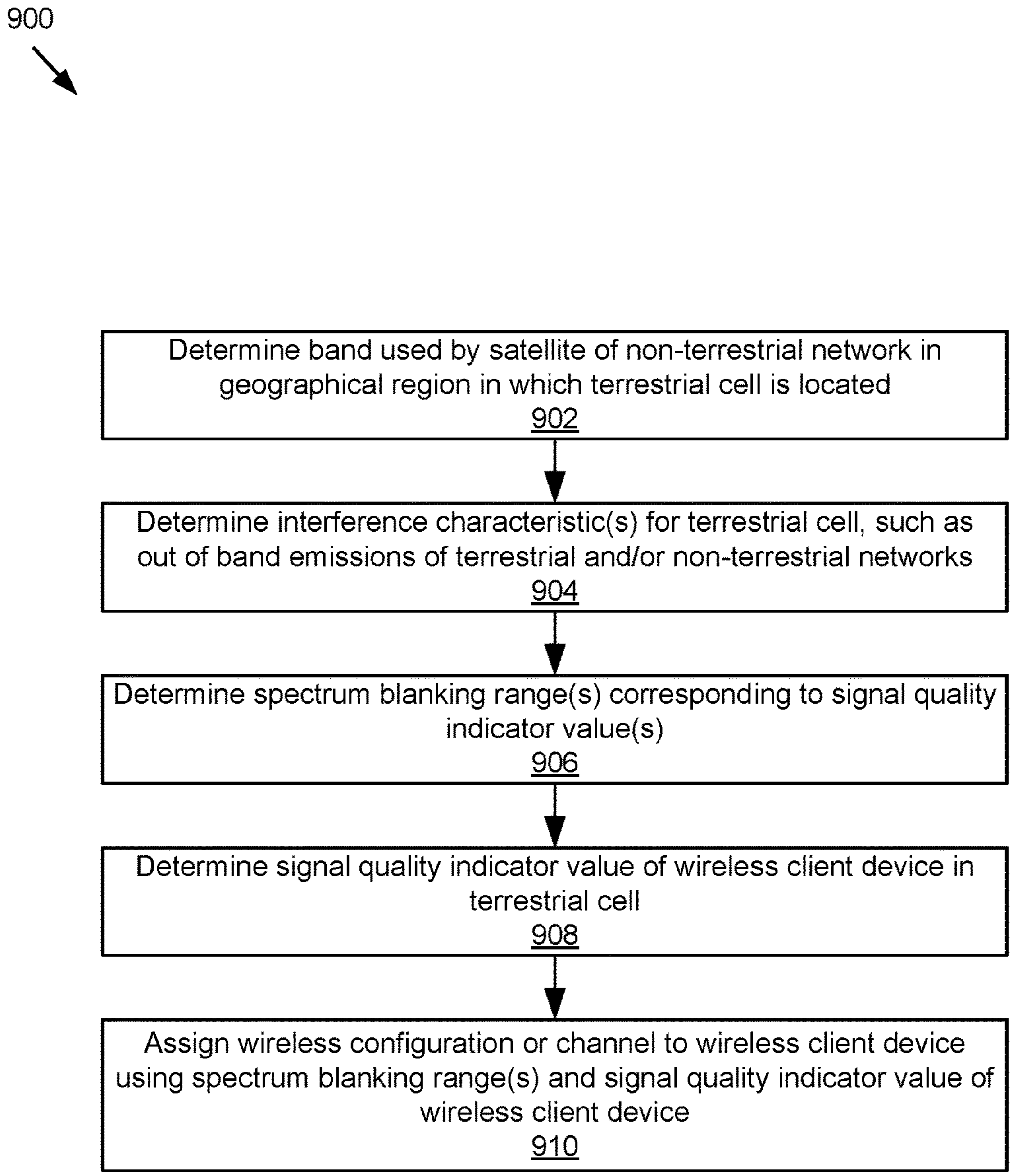
FIG. 9 is a block diagram illustrating an example method for managing interference for coexistence of terrestrial and non-terrestrial wireless networks, for example, using intelligent channel assignment to wireless client devices, such as, by ground node(s).

Further details or implementations for determining spectrum blanking ranges, frequencies available to be used by/assigned to/by a ground node(s), frequencies available to be used by/assigned to client devices 106, assignment of channels/frequencies to wireless client devices 106, and other features, such as those of operations 404, 406, and 408, are described in reference to FIG. 9.

At 406, the scheduler 108 may determine a signal quality indicator value for a wireless client device 106 in a cell area. In some implementations, a ground node(s) 116 may receive a signal, such as a registration message, from a wireless client device 106 in a cell associated with the ground node(s) 116. The ground node(s) 116 may determine, based on the message and/or the signal strength of the signal from the client device 106, the signal quality indicator value for the client device 106. Further details are described elsewhere herein, such as in reference to FIG. 9.

At 408, the scheduler 108 may assign a wireless configuration, such as a one or more communication channels/frequencies, to a wireless client device 106 using one or more assignable spectrum ranges and/or spectrum blanking ranges. For instance, the scheduler 108 may use the determined spectrum blanking range(s) to restrict the channels that may be assigned to a client device 106 with a defined signal quality indicator value.

As an example, the scheduler 108 may determine an assignable spectrum range and/or blanking range for a client device 106 based on the determined signal quality indicator value and may assign the channel/frequency(ies) to the wireless client device 106 based on the bucket or value into which the wireless client device 106 falls. In some implementations, as noted above, the blanking ranges may be based on a specific band used by a satellite 142 in the geographic region in which the cell, a ground node(s) 116, and/or client device 106 is located. When a cellular device connects to a cell tower, for example, for a phone call or connection, it may request a channel to use to communicate with that tower to perform the call. The tower may then assign the channel subject to the blanking range, which may be determined for the specific cellular device based on its signal strength and, potentially, satellite band serving the same region.

Figure 5:
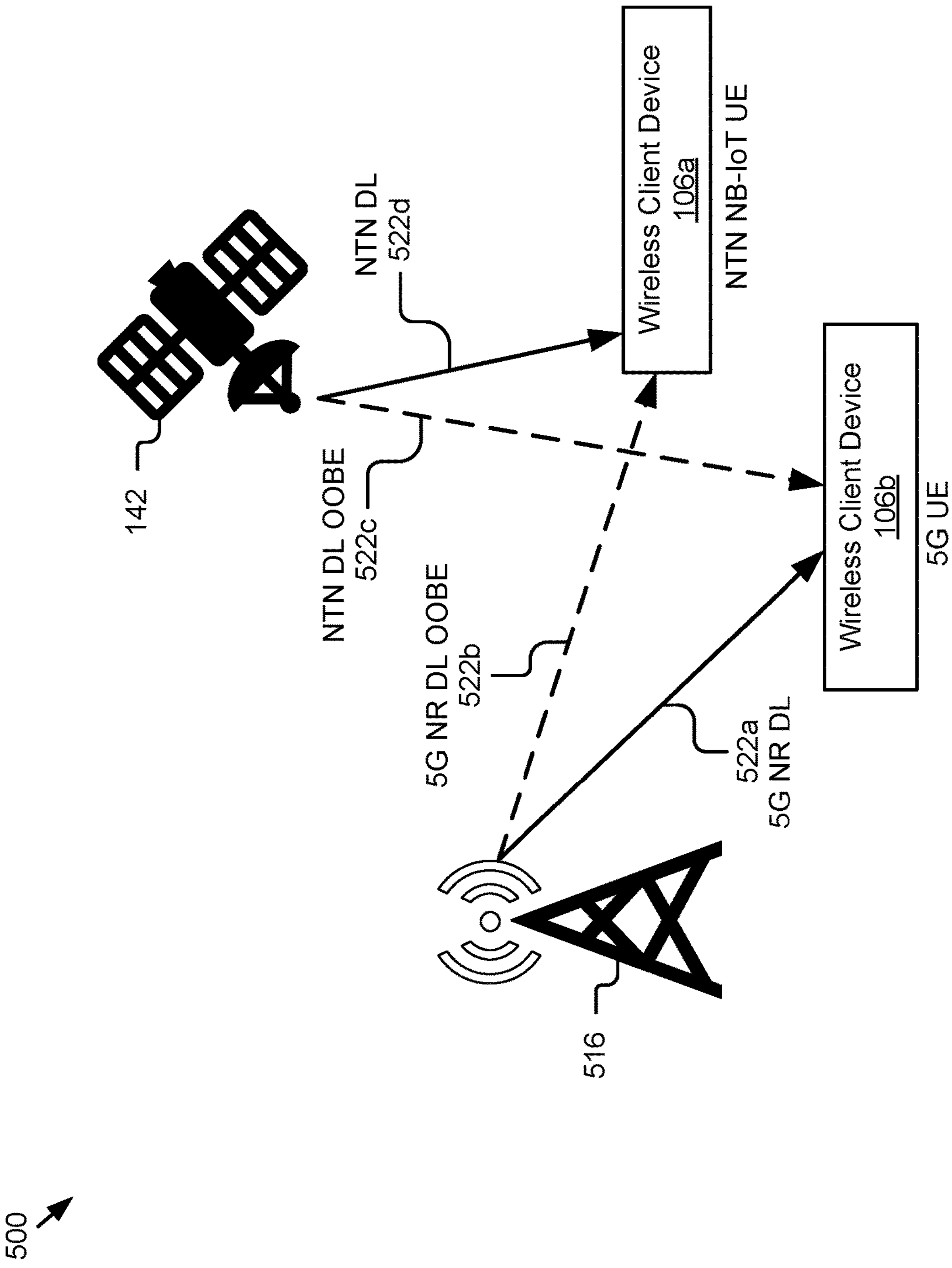
FIG. 5 illustrates an example diagram providing an example wireless environment in which interference issues may be present.

FIG. 5 illustrates an example diagram 500 providing an example wireless environment in which interference issues may be present. The diagram 500 includes a first wireless client device 106*a*, a second wireless client device 106*b*, a cell tower 516 (e.g., an example of a ground node(s) 116), and a satellite 142. It should be noted that the specific orientation, quantity, and arrangement of devices is provided as an example and that other arrangements are possible.

The diagram 500 also includes example signal lines 522*a*, 522*b*, 522*c*, and 522*d*, which illustrate electromagnetic waves transmitted and/or received by various devices. Example wavelengths are also provided for the signals. The signals 422*a* . . . 422*d* represent transmitted signals and/or their interferences, such as via out-of-band emission. It should be noted that, depending on the frequencies and communication protocols, different levels of interference may be present.

The diagram 500 may illustrate example interference issues for a downlink (e.g., of band 66). For example, even in cases where a 5G new radio base station downlink and the non-terrestrial network narrowband-IoT downlink are transmitting in on different frequencies, there may still be out-of-band emission issues due to the imperfect filter characteristics of the radio unit.

The depicted example diagram 500 illustrates at least two types of signal interferences. For example, the diagram 500 illustrates terrestrial downlink from a cell tower 516 interfering with a client device 106*a* attempting to receive downlink data from a satellite 142. Additionally, the diagram 500 illustrates the non-terrestrial downlink from a satellite 142 interfering with a client device 106*b* attempting to receive downlink data from a cell tower 516. Depending on the implementation, the scheduler 108 may use spectrum blanking, band assignment, channel assignment, and/or other technologies herein to reduce or avoid these interferences. In some instances, the scheduler 108 may determine out-of-band emissions to set and/or reduce the size(s) of the spectrum blanking ranges while avoiding interference.

In the illustrated example, the cell tower 516 is transmitting signal 522*a* (e.g., 5G new radio downlink) to a second wireless client device 106*b* (e.g., non-terrestrial connected user equipment, such as a smartphone or satellite phone) and the out-of-band emission (represented as signal line 522*b*) of signal 522*a* may cause interference on the first client device 106*a* (5G user equipment, such as a smartphone), where the first client device 106*a* is receiving a downlink signal (represented by signal line 522*d*) from the satellite 142. For instance, the interference/out-of-band emission 522*b* may interfere with the signal 522*d*.

In the illustrated example, the satellite 142 is transmitting signal 522*d* (e.g., non-terrestrial downlink) to a first wireless client device 106*a* and the out-of-band emission of signal 522*d* may cause interference (represented as signal line 522*c*) on the second client device 106*b*, where the second client device 106*b* is receiving a downlink signal (represented by signal line 522*a*) from the cell tower 516. For instance, the interference/out-of-band emission 522*c* interferes with the signal 522*a*.

It should be noted signal interference may be affected by various factors, such as the relative distances between devices, the directionality of antennas, the frequencies being used or their proximity, frequency filters, relative signal strengths, angles between devices, and/or other factors.

The technology described herein, such as the spectrum blanking and/or assignment of bands to satellites 142, may reduce this interference. Accordingly, implementations of the technologies described herein may address these various types of interference, for example, by adjusting band used, spectrum blanking ranges, and/or assigned/assignable channels/frequencies.

Figure 6:
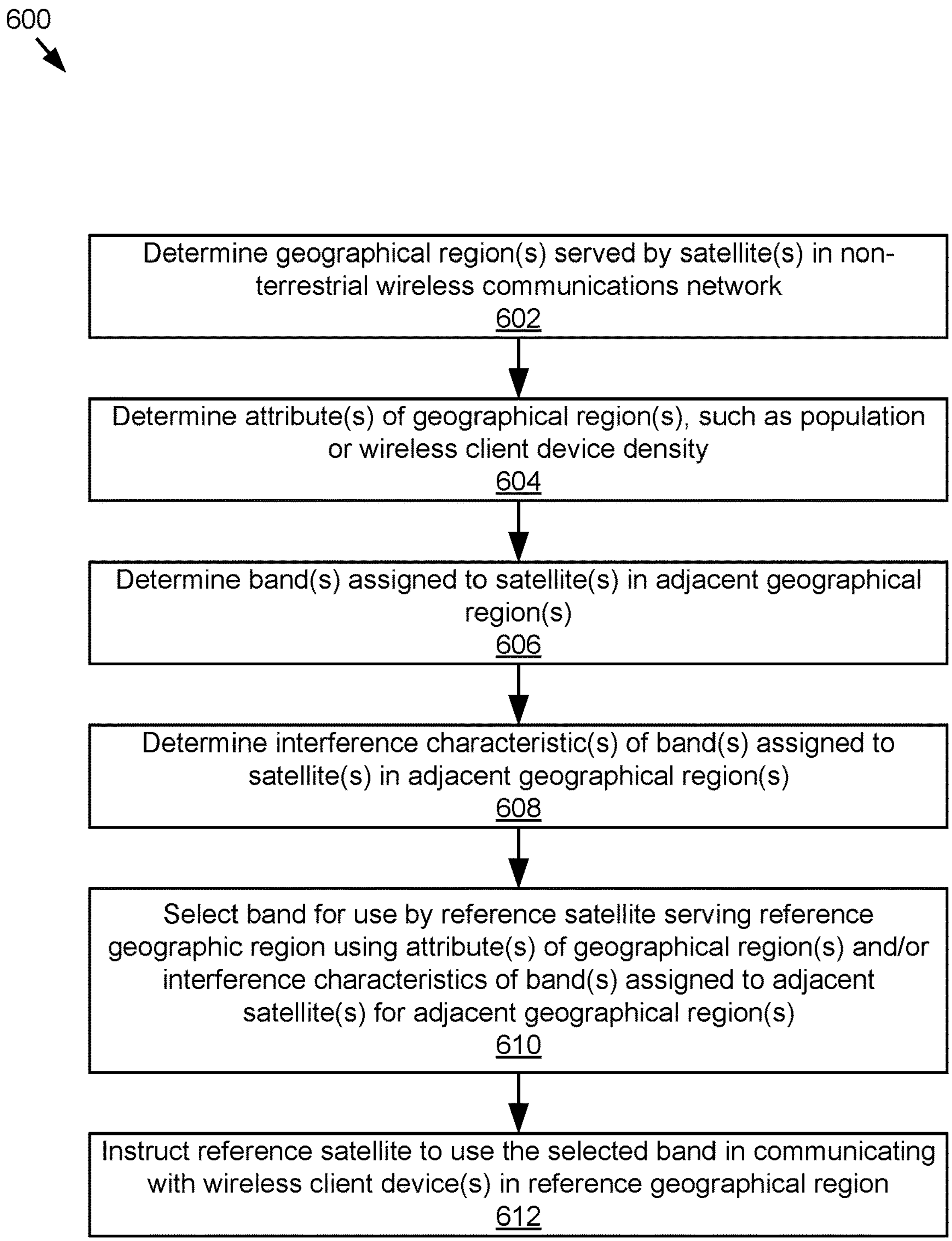
FIG. 6 is a block diagram illustrating an example method for managing interference for coexistence of terrestrial and non-terrestrial wireless networks, for example, using intelligent assignment of bands to satellites, satellite beams, and/or geographic regions.

FIG. 6 is a block diagram 600 illustrating an example method for managing interference for coexistence of terrestrial and non-terrestrial wireless networks, for example, using intelligent assignment of bands to satellites 142, satellite beams, and/or geographic regions. The method may intelligently assign bands to a constellation of satellites 142 and/or satellite bands in order to reduce interference between the satellite beams and between the terrestrial and non-terrestrial networks. For example, intelligent assignment of bands to satellites/geographic regions promotes coexistence of networks and satellite bands while reducing impact on a terrestrial network. Furthermore, the spectrum blanking, as described elsewhere herein, may adaptively use the various bands assigned to satellites 142/geographic regions, so the amount of spectrum blanking is adaptively reduced. Example details for band assignment may also be described in FIG. 7.

At 602, the scheduler 108 may determine one or more geographic regions served by one or more satellites 142 and/or satellite beams in a non-terrestrial wireless network. For instance, a constellation of satellites 142 may have an existing arrangement and the scheduler 108 may identify geographic regions corresponding to beam areas of the satellites 142. In other instances, geographic regions may be statically set whether for geostationary satellites 142 or satellites 142 in various orbits.

In some implementations, the scheduler 108 may determine or define an arrangement of geographic regions, beam areas, and/or satellites 142 based on various factors, such as a quantity of frequency bands that may be assigned to satellites 142 in a non-terrestrial network, such as those reserved for the non-terrestrial network as described above.

Figure 7:
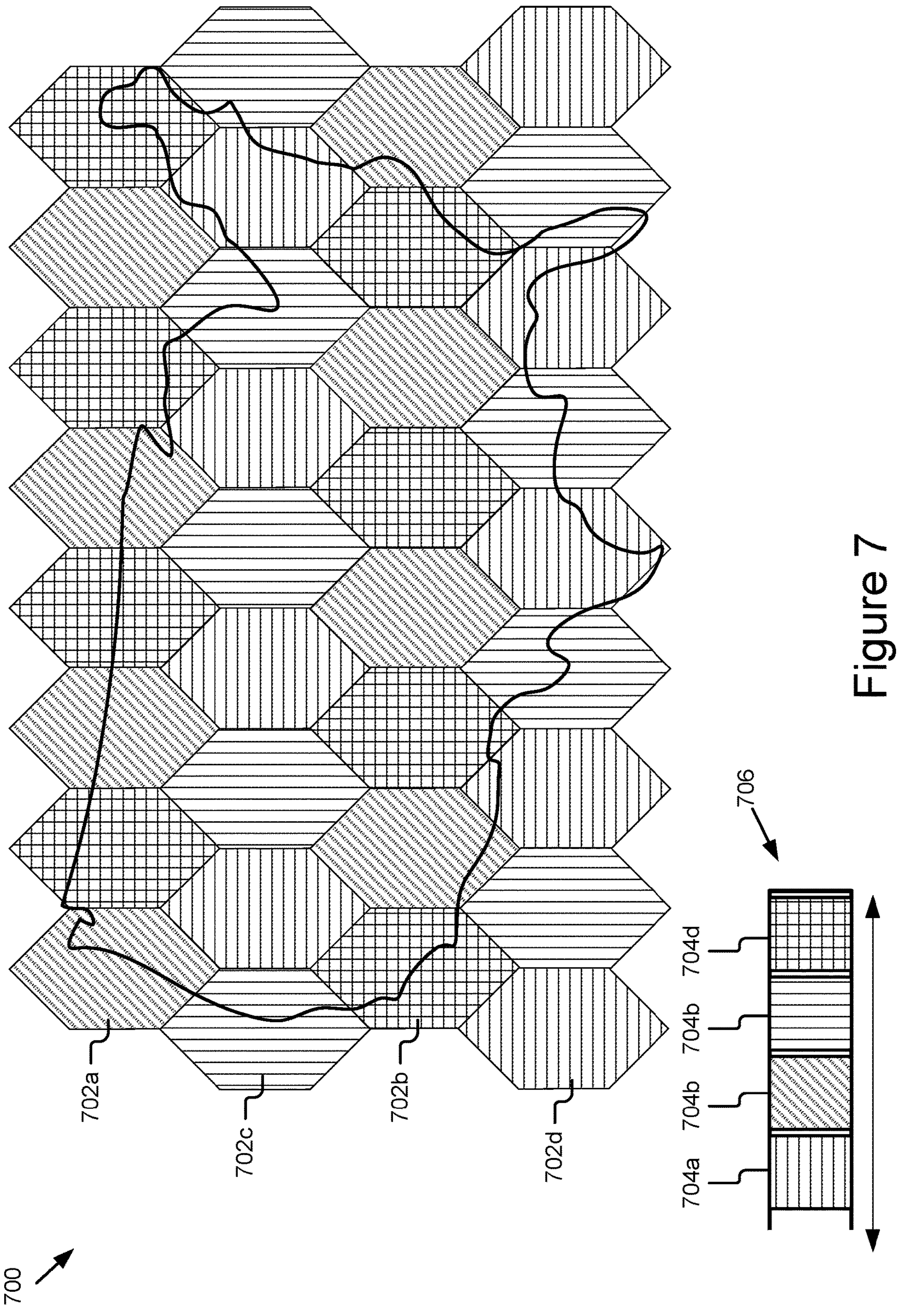
FIG. 7 illustrates an example map showing example regions served by bands used by satellites.

For example, an arrangement may be defined based on the quantity of satellites 142, bands, and beam areas (especially for satellites 142 transmitting multiple beams) in order to reduce overlap of beams/geographic regions using bands that are adjacent to one another on a frequency spectrum. While, depending on the quantity of bands used, it may not be possible to completely avoid adjacent bands from being assigned to adjacent regions/satellites 142/beams, these interactions may be reduced by using various arrangements, such as offsetting rows of regions, as illustrated in FIG. 7.

Further details and an example arrangement of satellites 142, bands, and beam areas or geographic regions are described below in reference to FIG. 7.

At 604, the scheduler 108 may determine one or more attributes of the one or more geographic regions, such as the population, population density, and/or wireless client device 106 density in the one or more geographic regions. For instance, the beam size, arrangement, or other attributes, such as population, etc., may be used to constrain the assignment of geographic regions, satellites 142, and/or bands. The attributes, such as the population, device density, may be based on census data, average quantity of client devices 106 connected in cell(s), or an administrative input. For instance, a scheduler 108 may receive a definition of the geographic region attribute from an administrator and/or from a database 128, third-party server 118, or other data source.

The size, shape, arrangement, or other configuration of satellites 142 and/or assignment of bands may be based on the population of devices, humans, etc., in one or more geographic areas (e.g., corresponding to satellite beam areas). For instance, higher frequency bands that are further offset from a pass band portion of a wireless spectrum used by wireless client devices 106 may be assigned in high-density regions (e.g., having a highest population, a highest quantity of client devices 106 in cell areas, etc.) in order to maximize the available spectrum/channels that may be assigned to client devices 106 for communications with a ground node(s) 116. Once the highest frequency band(s) are assigned to the highest population regions, closer (e.g., lower frequency bands) bands to the pass band portion of the spectrum may be assigned to remaining geographic regions and/or satellites 142 while avoiding adjacent frequency bands from being assigned to adjacent regions. Furthermore, the scheduler 108 may assign bands to a single satellite based on which of the satellite's 142 beams cover high or low population regions. Additionally, or alternatively, clusters of beams from adjacent satellites 142 may be organized into a larger arrangement. These and other operations are described in reference to FIG. 7 below.

At 606, the scheduler 108 may determine one or more bands assigned to one or more satellites 142 in the one or more adjacent geographic regions. The adjacent satellite(s) serve adjacent geographic regions to a reference geographic region served by a reference satellite (e.g., non-overlapping frequency resources allocated to one or more satellite services). For instance, a reference region and/or satellite 142 may be a region/satellite/satellite beam to which a band is currently being assigned, such as when bands are assigned sequentially, although other implementations are possible. In some implementations, bands may be assigned to a group of regions/satellites 142 together in order to reduce overall interference, for example, by maximizing the number of regions/satellites 142 at high bands and/or regions with high populations/population densities at high bands.

In some implementations, a single satellite 142 may have multiple beams that serve separate geographic regions. The scheduler 108 may assign bands to each beam or groups of beams of a satellite 142. A beam of a satellite 142 may be provided using one or more antennas, etc., of the satellite 142. For example, because interference among bands from a single satellite 142 is greater than would be interference from bands from multiple satellites 142, the scheduler 108 may schedule/assign bands to the beams of a satellite 142 to avoid adjacent beams from the same satellite 142 from having adjacent bands, where possible. For instance, where a satellite 142 has four beams arranged in a 2×2 grid (or a similar arrangement), adjacent bands may be assigned to opposing corner beams to reduce the amount of area/geographic region that is covered by adjacent bands from the same satellite 142.

Additionally, or alternatively, clusters of bands, for example, corresponding to a single satellite 142 may be assigned as a cluster into an overall arrangement of regions, which may or may not be based on adjacent frequency bands. Clusters of bands may be assigned in an arrangement to avoid overlap of the same band from separate satellites 142. Where possible, clusters of bands may additionally be assigned to avoid adjacent bands in a frequency spectrum from being assigned to adjacent regions and/or overlapping with those regions of adjacent satellites 142.

As noted above, a highest available band (e.g., in frequency and/or offset from a pass band portion of the spectrum) may be assigned to a region/beam/satellite 142 having a highest population/client device 106 density. A next region/satellite 142 may be assigned a next band in a pattern to avoid adjacent bands being assigned to adjacent regions.

For example, where bands 1, 2, 3, 4 (where these example numbers represent a sequence of bands based on frequency) are available to a non-terrestrial network, band 4 is assigned to a highest population area and an arrangement of bands 1, 2, and 3 may be assigned to adjacent regions. In some implementations, where rows of regions are offset, as illustrated in FIG. 7, adjacent bands being assigned to adjacent regions may be minimized.

At 608, the scheduler 108 may determine one or more interference characteristics of the band(s) assigned to the satellite(s) in the adjacent geographic region(s). The interference characteristics may include frequency (e.g., whether bands are adjacent to each other on a frequency spectrum), out-of-band emissions of frequency(ies) (e.g., for radio equipment used by a satellite 142, ground node(s) 116, or client device 106), or other characteristics affecting the likelihood of interference. Depending on the implementation, the one or more interference characteristics may include a proximity of the one or more frequency bands to the selected frequency band on a spectrum of electromagnetic frequencies, where bands that are adjacent in a frequency spectrum may have more interference with each other, while non-adjacent bands have less interference. For example, the interference characteristics may include a level of out-of-band emission and effect thereof associated with the one or more frequency bands used by the one or more adjacent satellites 142.

At 610, the scheduler 108 may select a band for use by a reference satellite 142 serving a reference geographic region, for example, using the one or more attributes of the geographic region(s) and/or interference characteristics of the band(s) assigned to the adjacent satellite(s) for the adjacent geographic region(s). It may select selecting a frequency band (e.g., a set of consecutive frequency bands or other bands) for use by the reference satellite 142 in the reference geographic region based on the one or more interference characteristics of the one or more frequency bands assigned to the one or more adjacent satellites 142, where the selected frequency band may be selected from a set of available frequency bands for non-terrestrial wireless communication with one or more wireless client devices 106.

In some implementations, a band may be selected for a geographic region based on the population density in that region. For instance, a highest band may be assigned to a highest population (e.g., of people, client devices 106, etc.) or population density region, and a lowest band may be assigned to a lowest population or population density region.

For example, a band for a given region may be selected based on how different it is (e.g., whether it is an adjacent frequency, likelihood of interference, etc.) to a band used/assigned to an adjacent geographic region. Other implementations are possible and contemplated herein.

At 612, the scheduler 108 may instruct the reference satellite 142 to use the selected band in communication with the wireless client device(s) in the reference geographic region. For example, the scheduler 108 may transmit an instruction to a satellite 142 and/or a configuration file associated with the satellite 142 to use the selected band. For example, a network server 122 may transmit an instruction directly to a satellite 142 (e.g., using a satellite dish) or may transmit a signal to a third-party server 118, which controls the satellite 142 and which may relay the instruction to the satellite. It should be noted that other configurations are possible and contemplated.

As illustrated in reference to FIG. 7, various spectrum bands 704 may be used by the non-terrestrial network in various geographic regions 702. FIG. 7 illustrates an example map 700 showing corresponding example regions 702 served by satellites 142. In some implementations, a single satellite 142 or satellite beam may serve (e.g., provide communications for) an individual region 702, although other implementations, such as using multiple satellites 142 for the same region or a single satellite 142 serving multiple regions, such as where a satellite 142 uses/transmits multiple beams, are possible.

As illustrated in FIG. 7, each geographic region 702*a*, 702*b*, 702*c*, and 702*d* may be associated with a separate band 704*a*, 704*b*, 704*c*, or 704*d* used by a satellite 142 (not shown in FIG. 7). The scheduler 108 may determine the band 704 used by a satellite 142 in a geographic region 702 in which a reference cell/ground node(s) 116 is located and use the determined band 704 in scaling, adjusting, assigning, or otherwise determining assignable spectrum range(s) and/or the spectrum blanking range(s), as described elsewhere herein. It should be noted that while four regions 702*a* . . . 702*d* are labeled, many are illustrated and additional or fewer may be used. The bands 704*a* . . . 704*d* may correspond to those described elsewhere herein, such as 304*a* . . . 304*d*, etc., respectively. The regions 702 and/or assignment of bands 704 may be static over a time period, continuously, or may be dynamically assigned or reassigned periodically, continuously, etc.

In some implementations, as illustrated in reference to FIG. 7 various arrangements of geographic regions 702 served by various satellites 142 may be used. For instance, while an example quantity, arrangement, and map are illustrated, the geographic regions 702 may be in different shapes, arrangements, locations, quantities, sizes, or other configurations.

As described in further detail above, multiple bands 704 may be assigned to avoid adjacent bands 704 and/or overlap for multi-beam satellites 142. Where the satellites 142 have multiple beams, bands 704 are assigned to the satellites 142 either separately or in context of the bands 704 for adjacent satellites 142.

It should be noted that where bands from multiple satellites 142 overlap at the cell, ground node(s) 116, and/or client device 106, a lowest or most proximate band from the satellites may be used to determine spectrum blanking.

The example arrangement of geographic regions 702 is illustrated in which each region 702 is hexagonal in shape, but they may be circular, rectangular, diamond shaped, have overlap, or otherwise. For instance, the regions 702 may be arranged, as illustrated, in offset rows of circular or other shaped satellite 142 transmission areas and devices or cells in those areas may correspond to a nearest satellite 142 resulting in an arrangement, such as the illustrated example.

Additionally, adjacent spectrum bands 704 may be assigned to non-adjacent geographic regions 702 to reduce interference to signals by satellites 142 serving adjacent geographic regions 702 (e.g., where the geographic regions overlap or meet), as illustrated in the example of FIG. 7. For instance, where four non-terrestrial bands 704 are used, rows of alternating bands 704 may be used to separate adjacent bands 704 from being transmitted in adjacent regions 702. For example, as illustrated in the spectrum portion 706, in the illustrated implementation, a first band 704*a* may be used in a first region 702*a*, a second band 704*b* may be used in a second region 702*b*, a third band 704*c* may be used in a third region 702*c*, and a fourth band 704*d* may be used in a fourth region 702*d*.

As noted above, because the selected band 704 for the non-terrestrial network in a geographic region 702 may reduce spectrum available to be used in a terrestrial network, higher frequency bands 704 (e.g., 704*d*) may be selected for use in higher population areas. For instance, higher bands (e.g., 704*d*) in a guard band may not affect channels available to a client device 106 for a terrestrial network while lower bands (e.g., 704*a*) may result in spectrum blanking and, therefore, reduced availability of channels for a ground node(s) 116 to assign to a client device 106.

It should be noted that the geographic regions 702 illustrated in FIG. 7 may not correspond to areas with higher or lower populations but is rather provided at a scale and simplicity to illustrate the technology.

As noted above, a scheduler 108 may access a map or table in a database 128, which represents the arrangement or locations of the geographic regions in performing its calculations. Additionally, or alternatively, the band 704 associated with a cell/ground node(s) 116 may be programmed into a configuration file (e.g., in a stored value or pointer) for the cell/ground node(s) 116 using the arrangement information, which is illustrated in FIG. 7, so that overall processing by the scheduler 108 is reduced.

Figure 8:
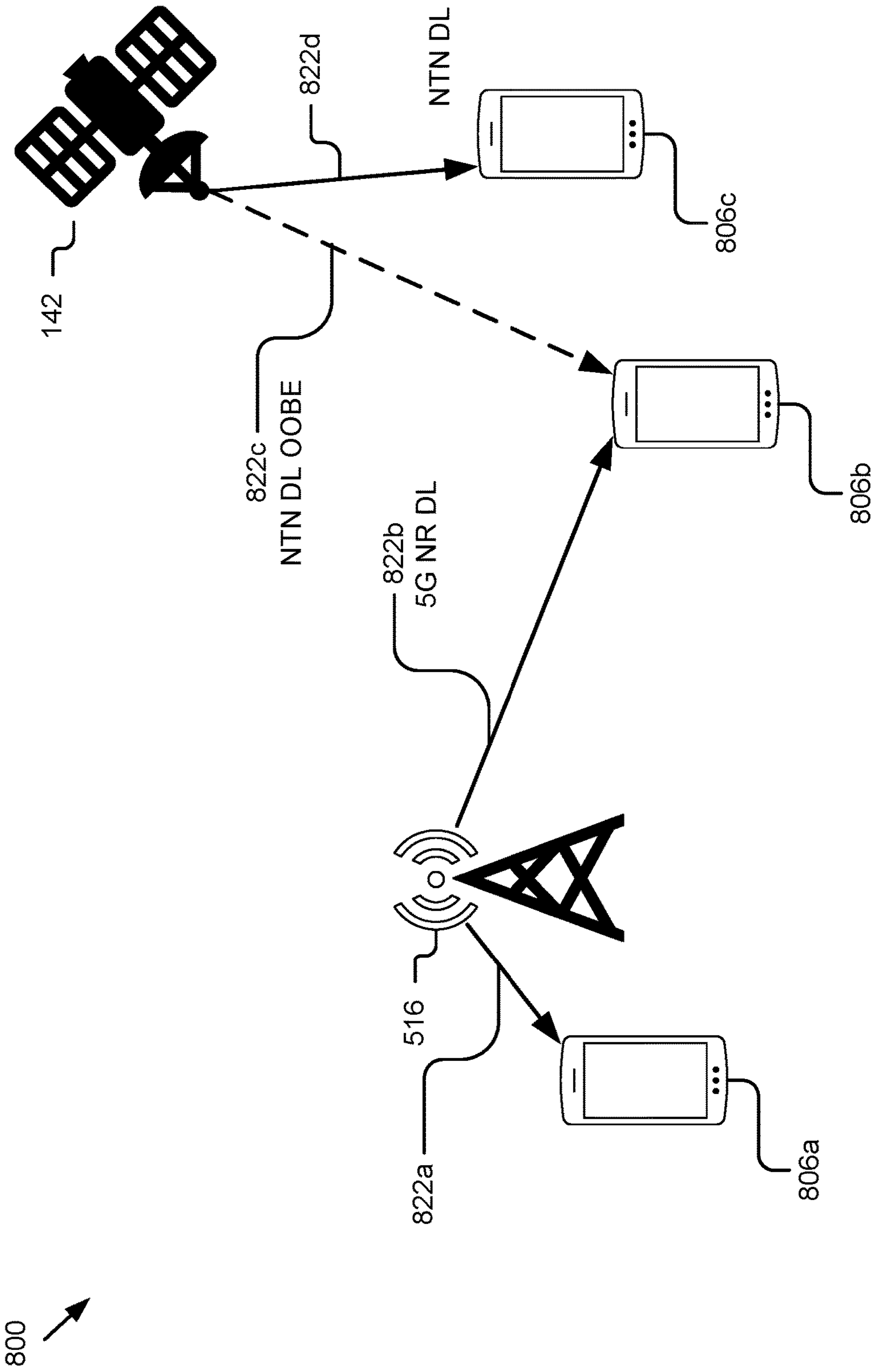
FIG. 8 illustrates an example diagram providing an example wireless environment in which interference issues may be present.

FIG. 8 illustrates an example diagram 800 providing an example wireless environment in which interference issues may be present. For example, the diagram 800 illustrates interference issues for one or more cellular phones or other devices 806*a*, 806*b*, and 806*c*, which may represent example wireless client devices 106. For instance, a phone 806 may be a 5G new radio device experiencing downlink interference in the diagram 800. As illustrated, phones 806 a cell edge may be more sensitive to interference/noise than those near a cell tower 516, for example, from out-of-band emissions from a non-terrestrial (e.g., narrowband IoT) signal.

As illustrated, multiple signals 822*a* . . . 822*d*, whether intentional or interference (e.g., out-of-band emissions) may be present in a given terrestrial and non-terrestrial network environment. As illustrated, a cell tower 516 (which may be an example of a ground node 116) may transmit a first signal 822*a* to a first phone 806*a* and a second signal 822*b* (e.g., 5G new radio downlink) to a second phone 806*b* (e.g., via a separate channel). Because the second phone 806*b* is at a cell edge/further from the cell tower 516 than, for instance, the first phone 806*a*, it may experience lower signal power, which may cause it to be more affected by noise/interference. For example, a satellite 142 is illustrated transmitting a signal 822*d* (e.g., a non-terrestrial downlink) to a third phone 806*c*, which may or may not be near the second phone 806*b*. The signal 822*d*/satellite 142 may cause interference represented by signal line 822*c* (e.g., non-terrestrial downlink out-of-band emissions) on the second phone 806*b*. Accordingly, the signal 822*c* may cause interference with the signal 822*b*, which may result in reliability, dropped calls or packets, or other issues for the second phone 806*b*.

As an illustrative example, where a second phone 806*b* is far from a cell tower 516, the signals 822*b* received from the cell tower 816 by the second phone 806*b* are more susceptible (e.g., due to signal amplification) to interference, such as noise or out-of-band emissions from other transmissions. For instance, where satellite 142 is using a band in line 822*d* that is near in frequency to the channel(s) used by the phone 806*b* (e.g., with the cell tower 516), the impact of out-of-band emissions represented by line 822*c* is increased. Accordingly, the scheduler 108 may use spectrum blanking to increase the offset of the channel(s) used by the phone 806*b* thereby reducing interference from the satellite's band(s), such as due to the out-of-band emissions. As noted throughout this disclosure, the spectrum blanking and/or offset may be determined for the phone 806*b* (and/or cell tower 516, region, etc.) based on signal strength between the phone 806*b* and the cell tower 516 and/or relative positioning of the frequency band(s) used by the satellite 142.

In some implementations, the scheduler 108 may also determine the signal strength and/or transmit power between a cell tower 416 and a cellular device 406, which it may use to determine spectrum blanking. Additionally, the scheduler 108 may determine an out-of-band emission signal strength of a non-terrestrial network based on attributes of the satellite 142, such as its specifications, the elevation angle, and/or the distance to the satellite 142. Accordingly, using these and/or other factors, the scheduler 108 may generate various mitigation strategies, such as determining spectrum blanking ranges and/or assigning frequencies/channels, among other technologies.

FIG. 9 is a block diagram 900 illustrating an example method for managing interference for coexistence of terrestrial and non-terrestrial wireless networks, for example, using intelligent channel assignment to wireless client devices 106, such as, by a ground node(s) 116. For instance, the operations and features of FIG. 9 may provide additional details to the operations of FIG. 4. The operations of the method may improve spectrum efficiency by adaptively customizing blanking ranges/thresholds, thereby providing efficiency while facilitating better coexistence between the terrestrial and non-terrestrial networks.

For example, FIG. 9 may adaptively, and intelligently blank regions of an electromagnetic spectrum based on satellite/non-terrestrial network bands and/or signal quality indicator values. It should be noted that where a satellite's band is high enough in a guard band that it (e.g., its out-of-band emissions) does not interfere with spectrum used by the terrestrial network (e.g., a ground node(s) 116 to communicate with a wireless client device 106), no spectrum blanking may be used. Similarly, where a wireless client device 106 has a high enough signal quality indicator value for one or more channels, so it is not affected by non-terrestrial network signals, the scheduler 108 may not use any spectrum blanking for the client device 106.

It should be noted that certain operations described herein may be performed in advance or may be performed in real time. For instance, the scheduler 108 (or another component) may determine spectrum blanking ranges for certain (e.g., for ranges thereof) signal quality indicator values in advance and then assign a client device 106 to a range when the client device 106 attempts to connect to a ground node(s) 116. In some instances, spectrum blocking ranges may be determined for multiple cells or ground nodes 116 and then customized to a specific cell or a corresponding ground node(s) 116 using factors, such as satellite 142 elevation or non-terrestrial bands used in the same geographic region as the cell. The scheduler 108 may then determine a signal quality indicator value of a client device 106 to determine a spectrum blanking range, assignable frequency range, and/or channel for that client device 106. It should be noted that the values and calculations may be initiated, periodically updated, or performed at various frequencies.

At 902, the scheduler 108 may determine a band used by a satellite 142 of a non-terrestrial network in a geographic region in which a terrestrial cell is located. For example, the scheduler 108 may receive configuration data, retrieve a file from a database 128, detect a band transmitted by a satellite, or otherwise determine the band used in an area/region in which a ground node(s) 116 and/or a client device 106 is located. In some implementations, the scheduler 108 may determine a location of a cell or cell tower and use this location to look up a band assigned to a corresponding region for a satellite/non-terrestrial network.

At 904, the scheduler 108 may determine one or more interference characteristics for the terrestrial cell, such as out-of-band emissions of the terrestrial and/or non-terrestrial networks with transmissions to or from the cell area. For instance, as described below, the scheduler 108 may determine the out-of-band emissions of the determined band used by the non-terrestrial network and/or other bands or channels used by other devices in the cell.

At 906, the scheduler 108 may determine one or more spectrum blanking ranges corresponding to one or more signal quality indicator values. For example, the scheduler 108 may determine one or more spectrum blanking ranges for wireless client devices 106 communicatively coupled with a ground node(s) 116 (e.g., a cell tower(s), cellular antenna(s)) for a cell. For instance, the spectrum blanking range(s) may restrict wireless frequencies, bands, or channels in the one or more spectrum blanking ranges from being assigned to a wireless client device 106, for example, by a ground node(s) 116.

It should be noted that the definition of blanking or assignable frequency ranges, bands, blocks (e.g., physical resource blocks), or channels, may be defined positively or negatively the by the scheduler 108. For example, in some implementations, the scheduler 108 may define blanking ranges in which frequencies are not assigned/used for communication. Additionally, or alternatively, the scheduler 108 may positively determine frequency ranges that may be assigned for communication. For instance, a positively determined assignable frequency range may be the inverse of a blanking frequency range.

In some implementations, the scheduler 108 may determine spectrum blanking ranges based on the signal quality indicators/indicator values for a wireless client device 106 (e.g., for an identified client device 106 and/or a generic client device 106). The signal quality indicator value may indicate that a client device 106 has a certain quality of wireless signal relative to a ground node(s) 116 and, based on this value, the scheduler 108 may determine a certain spectrum blanking specific to the client device 106. For example, if the signal quality indicator value indicates that the cell reception is poor for the client device 106, the scheduler 108 may assign a relatively large blanking range to the client device 106. Similarly, if the cell reception is good for the scheduler 108 may assign a relatively small blanking range to the client device 106. Accordingly, the scheduler 108 may intelligently prevent the client device 106 from being assigned frequencies/channels that are more likely to receive or cause interference from a non-terrestrial signal.

It should be noted that in addition to, or in alternative to, the signal quality indicator, the scheduler 108 may use the location of a client device 106 to determine spectrum blanking ranges. For example, the scheduler 108 may determine larger or differently positioned spectrum blanking ranges to client devices 106 farther from the ground node(s) 116/tower and/or may determine smaller or higher spectrum blanking ranges. For example, the location and/or proximity may be interchangeable and/or serve as an indicator or proxy for the signal quality indicator.

Figure 10:
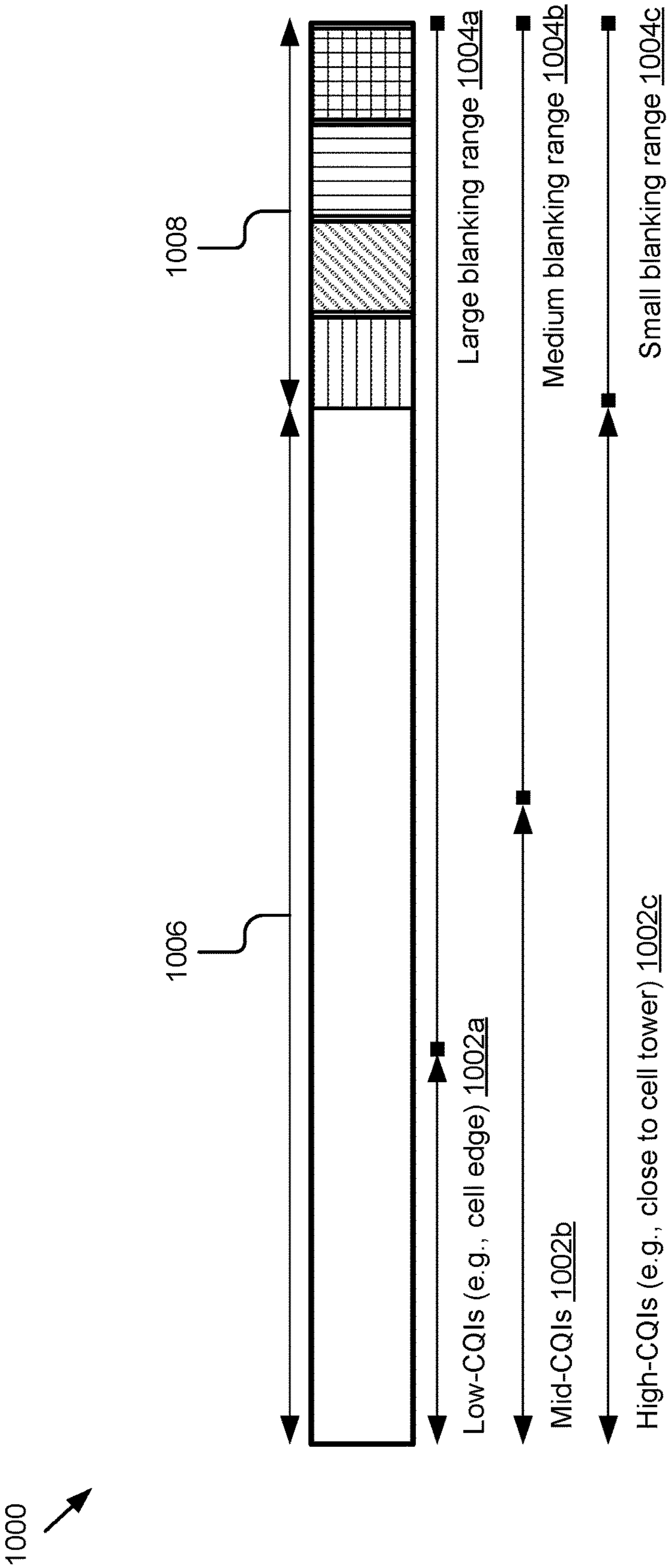
FIGS. 10, 11A, and 11B illustrate example diagrams of a wireless spectrum used by wireless client devices along with example blanking ranges.
Figure 11A:
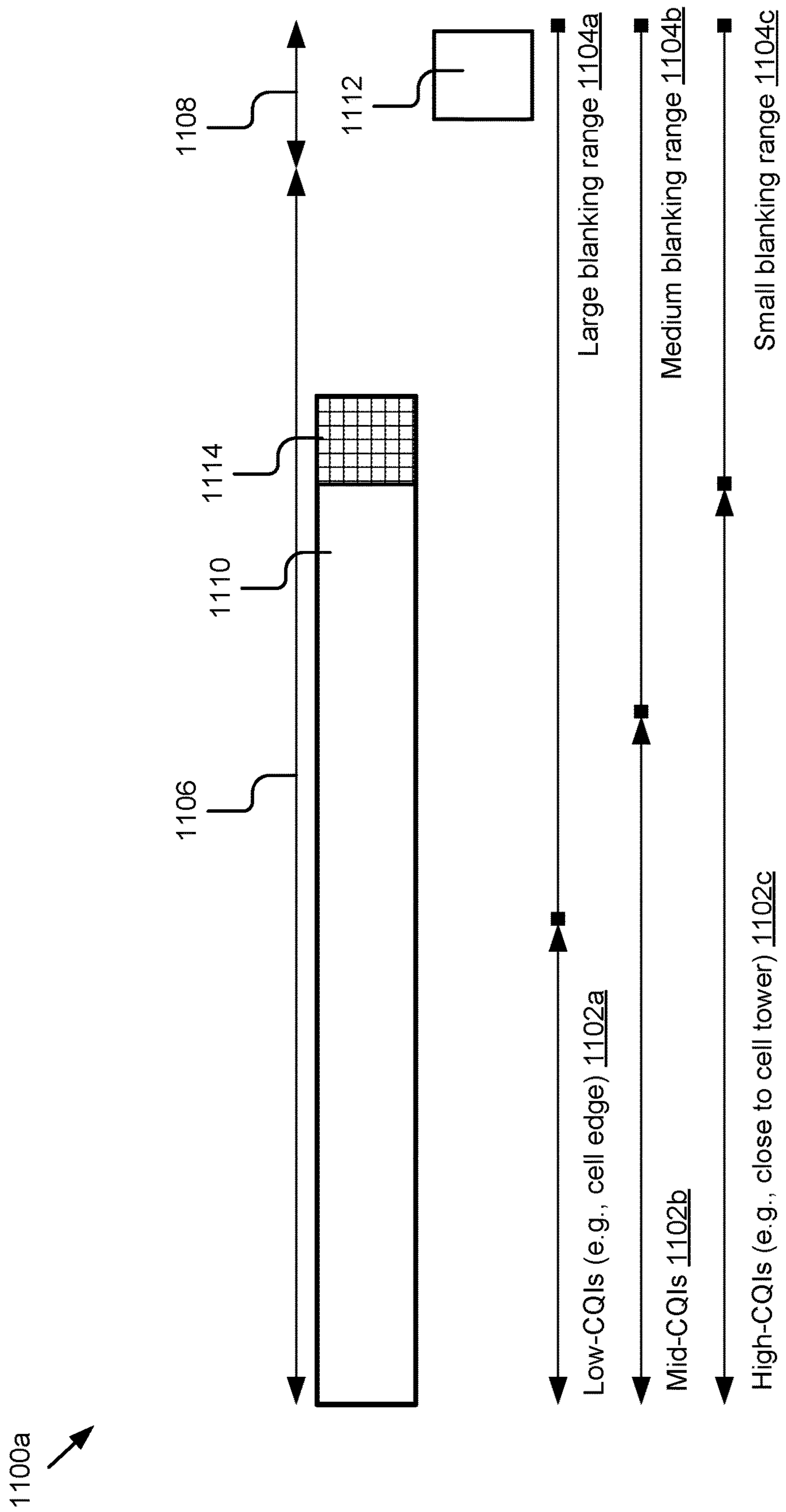
Figure 11B:
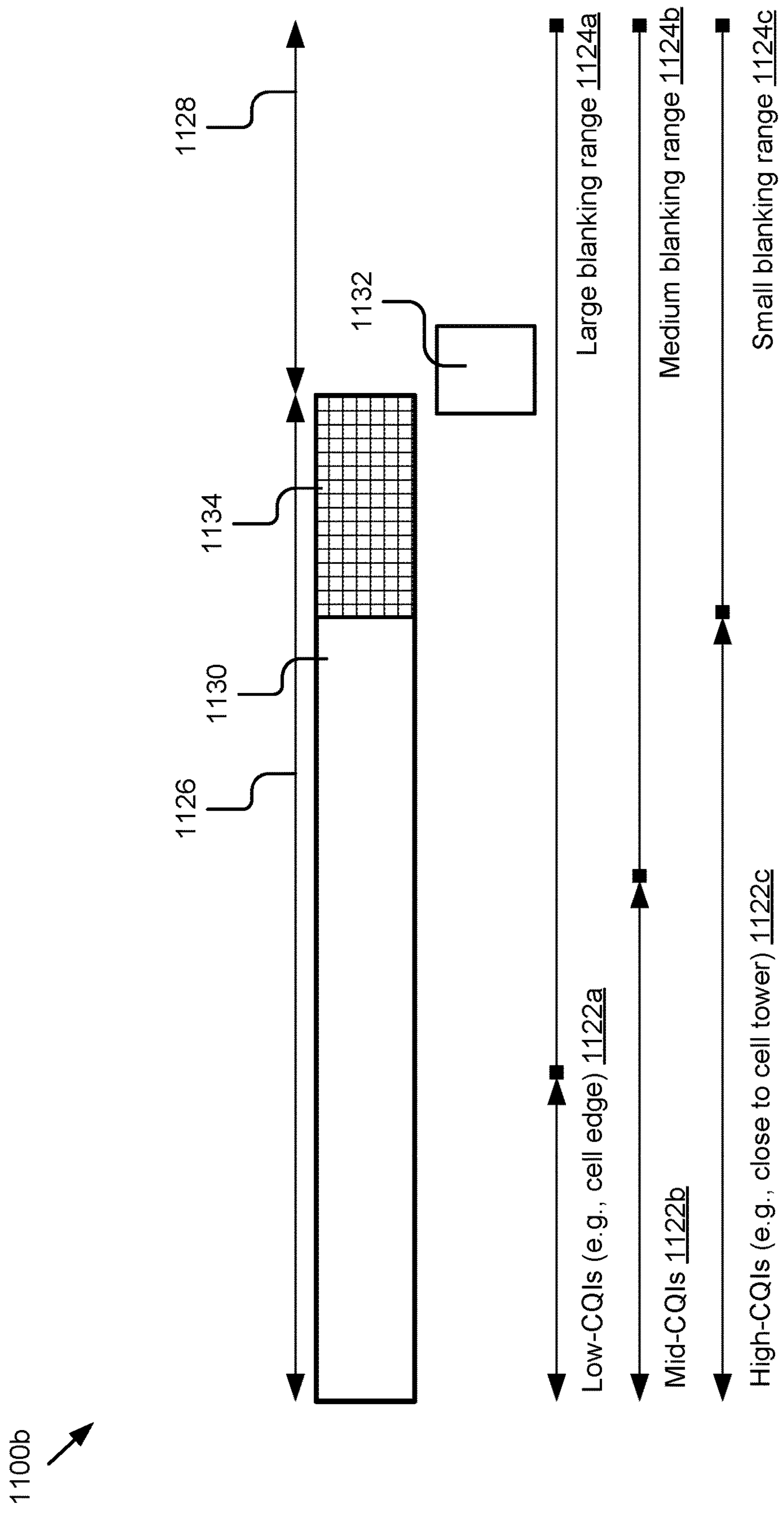

In some implementations, as described in reference to FIGS. 10-11B, spectrum blanking ranges may be associated with certain signal quality indicator values or ranges thereof. For instance, signal quality indicator values may be bucketed into high, medium, and low; although, other numbers or types of buckets are possible. Blanking ranges may be determined for each of the buckets. For example, as illustrated in FIG. 10 and described below, assignable spectrum ranges and/or blanking ranges may correspond to each of the buckets of signal quality indicator values. It should be noted that in some implementations, the assignable ranges or blanking ranges may be infinitely variable or have smaller increments/buckets.

The scheduler 108 may determine a scaling ratio and/or blanking frequency ranges based on the frequency spectrum used by the satellite 142. For instance, similar to the implementations described above, the scheduler 108 may use the identified frequency(ies) or bands to adjust the blanking ranges.

The scheduler 108 may increase blanking range sizes or locations, for example, to maintain a certain frequency offset from the spectrum bands/blocks used in a defined geographic region by a non-terrestrial network or satellite 142. This factor (e.g., position in the spectrum of band used by a satellite 142) may be used separately or in combination with the factors described above, such as signal quality indicator, elevation angle, distance to satellite 142, etc., to determine assignable frequency ranges and/or blanking ranges.

For instance, an initial set of blanking ranges may be determined for groupings of signal quality indicator values. This initial set of blanking ranges may be used across cells/ground node(s) 116 in a terrestrial cell network. The initial set of blanking ranges may then be adjusted for specific cells based on other factors, such as elevation angle, distance to a satellite 142, bands used by satellites 142 for the geographic region of the cell and/or ground node(s) 116, and/or other factors. In some implementations, the scheduler 108 may determine the initial set of blanking ranges and then modify the blanking ranges based on satellite 142 elevation angle. In some implementations, the scheduler 108 may also or alternatively modify the blanking ranges based on the band(s) used by the satellite 142 in the geographic region corresponding to the cell/cell tower. The various factors affecting assignable or blanking ranges may act together or against each other constructively or destructively and may have varying levels of impact on the sizes of the ranges. For instance, the scheduler 108 may know the out-of-band requirements of the network and/or devices and use the requirements, along with measured, user defined, or other out-of-band emissions to define the sizes, thresholds, and/or offsets of spectrum blanking ranges. The relative weights of each of the factors may be defined by an administrator or determined by the scheduler 108, for example, using measurements of the interference applied to train the weights in a machine learning model.

As noted elsewhere herein, the frequency offset of the spectrum blanking range(s) may be determined based on a size and/or strength of out-of-band emissions of bands or channels used in a terrestrial and/or non-terrestrial network.

As noted elsewhere herein, these computations may be performed periodically, in response to a change in a terrestrial or non-terrestrial network, or continuously/in real or near real time. For instance, upon receiving a trigger to update blanking ranges, the scheduler 108 may update the blanking ranges for one or more cells/ground nodes 116. The scheduler 108 may then then determine a signal quality indicator value for an identified client device 106, place the client device 106 into one of the pre-determined buckets (e.g., low, mid, or high-signal quality indicator value with associated determined blanking ranges), and assign channels to the client device 106 subject to flexibility defined by the assignable ranges or blanking ranges, as described throughout this disclosure.

At 908, the scheduler 108 may determine a signal quality indicator value of a client device 106 in the terrestrial cell/cell area. For instance, signal quality indicator values may be on a scale of 0-19 and may be grouped into separate buckets, each of which buckets may have a separate, pre-determined spectrum blanking range, threshold, or offset. The scheduler 108 may determine (e.g., based on a message from a client device 106) a channel quality information/signal quality indicator value from 0-19 for the particular client device 106 and assign it to one of the buckets. Accordingly, using the signal quality, the scheduler 108 may determine a spectrum blanking range/set of assignable channels for the particular client device 106.

For example, the scheduler 108 may receive a wireless signal from a wireless client device 106, which may identify the wireless client device 106. For instance, a ground node(s) 116 on which the scheduler 108 is executed, or with which the scheduler 108 is communicatively coupled, may receive a signal or message via a control channel, such as a request for registration or authorization to use the ground node(s) 116 in the cell, although other implementations are possible. In some instances, the wireless signal may indicate a strength with which it was transmitted, a strength of a signal received from the ground node(s) 116, or another indicator of cellular network/signal quality, for example, the wireless signal may indicate a signal quality indicator value.

The scheduler 108 may determine, based on the received wireless signal(s), a channel quality information/signal quality indicator value (or other indicator of signal strength) for the wireless client device 106. For instance, the signal quality indicator value may be determined relative to one or more antennas of the ground node(s) 116.

In some implementations, the scheduler 108 may determine an assignable spectrum range and/or blanking frequencies for the identified wireless client device 106 using the determined signal quality indicator value and the determined spectrum blanking range(s). For instance, the scheduler 108 may determine an assignable spectrum range and/or blanking range(s)/frequencies for a specific wireless client device 106 by placing the specific wireless client into a bucket or range computed at 506. For example, where three buckets or groupings were determined at 906, the scheduler 108 may assign the identified client device 106 to a bucket based on its signal quality indicator value's proximity to bucket threshold(s).

At 910, the scheduler 108 may assign a wireless configuration, such as a channel, to the wireless client device 106 using the spectrum blanking range(s) and signal quality indicator value of the wireless client device 106. For instance, the scheduler 108 may assign a specific channel or frequency pair to the identified wireless client device 106, such as for communication with the terrestrial ground jnode(s) 116. The channel may be selected from available spectrum outside the spectrum blanking range(s). Accordingly, where blanking ranges are small, there is increased flexibility in which channel is assigned while where blanking ranges are large, the assignable channels are more limited, as described below.

As an illustrative example, a wireless client device 106 having a high signal quality indicator value may be assigned a channel within the range of frequencies, while a wireless client device 106 having a low signal quality indicator value may be assigned a channel within the smaller range of frequencies. As described elsewhere herein, additional or alternative factors to the signal quality indicator may be used to determine and/or assign channels and/or blanking ranges.

Accordingly, client devices 106 that are less susceptible to cause and/or receive interference may be intelligently assigned channels that reduce the interference. For instance, the scheduler 108 may assign a channel (e.g., for a terrestrial cellular network) to a client device 106 that intelligently minimizes interference from a second client device 106 communicating with a non-terrestrial network and/or other interference while also maximizing coexistence and efficiency of the wireless spectrum.

FIG. 10 illustrates a simplified diagram 1000 of a wireless spectrum used by wireless client devices 106, such as mobile phones with cellular radios. As described in reference to FIG. 3, the spectrum may include frequency bands or frequency ranges used by a terrestrial network (represented by line 1006) and a non-terrestrial network (represented by line 1008), for example, for downlinks. FIG. 10 further illustrates assignable spectrum ranges 1002 and/or spectrum blanking ranges 1004, but it should be noted that these ranges, their relative sizes, and their relationships to the available spectrum may vary without departing from the scope of this disclosure.

In some implementations, as illustrated in the example of FIG. 10, signal quality indicator values may be grouped into buckets, to which the scheduler 108 may assign spectrum blanking ranges/thresholds/offsets. For example, the scheduler 108 may determine a relatively smaller assignable spectrum range 1002*a* and/or a larger blanking range 1004*a* for client devices 106 with low signal quality indicator values (e.g., for client devices 106 located at a cell edge). The scheduler 108 may determine a relatively medium-sized assignable spectrum range 1002*b* and/or a medium-sized blanking range 1004*b* for client devices 106 with mid-signal quality indicator values. The scheduler 108 may determine a relatively larger assignable spectrum range 1002*c* and/or a smaller blanking range 1004*c* for client devices 106 with high signal quality indicator values (e.g., for client devices 106 located close to a cell tower). It should be noted that other thresholds and ranges may be used. It should also be noted that the relative sizes of ranges illustrated herein are provided for illustration and may not represent real-world relative scales or sizes of the ranges. The real-world scales or sizes may vary depending on administrative settings, such as a desired offset from measured out-of-band emissions or a set offset between frequencies. Additionally, or alternatively, as noted elsewhere herein, measured interference values and varying sizes, weights, scales, etc., of blanking ranges or offsets may be fed into a supervised learning model and used to automatically train weights, sizes, or offsets of the blanking ranges.

It should be noted that while the scheduler 108 may assign spectrum blanking ranges to cover the portions of the spectrum used by other networks, such as the non-terrestrial network (e.g., as described above), other configurations are possible. For instance, the spectrum blanking ranges may be located at a top, bottom, center, and/or other portion of the assignable spectrum for wireless client devices 106.

Although the assignable spectrum ranges and/or blanking ranges are illustrated as matching perfectly to each other and to the bands of the terrestrial and non-terrestrial networks, the scheduler 108 may also determine or provide buffer ranges that decrease out-of-band emissions, for example, by further separating the assignable ranges used by a non-terrestrial and/or terrestrial network.

The scheduler 108 may determine the spectrum blanking ranges using the position of the client device(s) 106, ground node(s) 116, and/or satellite(s) 142. For example, the scheduler 108 may determine one or more satellites 142 that serve a geographic area corresponding to a cell area of the ground node(s) 116 with which the client device 106 is communicating. The scheduler 108 may set the spectrum blanking range(s) based on the position of the satellite 142, for example, relative to the client device 106 and/or ground node(s) 116 (e.g., cell tower), and/or based on the band(s) used by the satellite 142 in the cell area.

In some implementations, the scheduler 108 may know the signal quality indicator value(s) for wireless client device(s) 106, but not their locations directly. As noted above, the relative locations to a ground node(s) 116 may be inferred from the wireless quality indicator value(s). The spectrum schedule may know a client device's 106 location is within a cell served by the ground node(s) 116 and may therefore, for purposes of the proximity, geographic region, and/or elevation angle computations described herein, determine that all client devices 106 in the cell are located at the same location (e.g., at the location of the ground node(s) 116 or cell tower). Accordingly, the scheduler 108 may use the location of the ground node(s) 116/cell tower in calculations of the relative strength of the non-terrestrial network's signals from/to a satellite 142, which information may be used to determine how susceptible the client devices 106 are to receive or cause interference, which may be used to assign spectrum ranges and/or blanking ranges, as described elsewhere herein.

In some implementations, the scheduler 108 may use the proximity and/or elevation (e.g., which affects the signal strength and/or interference characteristics, as described elsewhere herein) between satellite 142 and the ground node(s) 116 (and/or client device 106) to determining the sizes/configuration of the blanking ranges. For instance, when the satellite 142 is closer to the wireless client device 106, the scheduler 108 may determine a larger blanking range. Similarly, a lower elevation angle may cause the scheduler 108 to assign a larger blanking range.

In some implementations, the scheduler 108 may use the non-terrestrial network's bands, such as the physical resource blocks of satellites 142 serving the same area as the cell/ground node(s) 116, to determine the assignable ranges/blanking ranges. For instance, different satellites 142 may use different bands, and the scheduler 108 may determine these blocks/bands based on the specific location (e.g., based on a mapping of bands to geographic areas) served by a satellite 142 and/or the satellite's 142 location as well as, for instance, the location of the cell, ground node(s) 116, and/or client device 106. These and other implementations are described in further detail in reference to FIGS. 11A and 11B.

FIGS. 11A and 11B illustrate a simplified diagrams 1100*a* and 1100*b*, respectfully, of a wireless spectrum(s) used by wireless client devices 106, such as mobile phones with cellular radios. The wireless spectrum(s) illustrated in diagrams 1100*a* and 1100*b* may correspond to those of FIGS. 3 and 10, although they may be different, depending on the implementation.

FIG. 11A illustrates a portion 1106 of the spectrum that may be used by a ground node(s) 116 in a terrestrial network and a second portion 1108 that may be used by a non-terrestrial network (e.g., by a satellite 142), for example, in the same geographic region as the ground node(s) 116/cell. These portions 1106 and 1108 may be assigned or allocated to each network on a region-by-region basis or otherwise. In some instances, even though a terrestrial network may have the ability a portion 1106, it may only typically use a pass-band portion 1110 for communications with wireless client devices 106.

As illustrated in FIG. 11A, a satellite 142 for a cell/ground node(s) 116 (e.g., for a region in which the cell is located) may use a high band 1112 in the spectrum. Accordingly, the scheduler 108 may set or increase the sizes of assignable spectrum ranges 1102 and decrease the sizes of blanking ranges 1104, so that there are more channels/frequencies that may be assigned to a client device 106. For instance, assignable ranges 1102*a*, 1102*b*, 1102*c*, and corresponding blanking ranges 1104*a*, 1104*b*, and 1104*c*.

In some implementations, the scheduler 108 may determine or use a spectrum blanking range 1114, which reduces the portion of the pass band 1110 used by a terrestrial network for communications between a ground node(s) 116 and client devices 106. The spectrum blanking range 1114 may be a range assigned based on the non-terrestrial band 1112 (e.g., as a control channel), but, as illustrated, blanking ranges 1104 may additionally or alternatively be used with client devices 106 based on their signal quality indicator. For instance, the blanking range 1114 may be an additional portion or factor added to the blanking range(s) 1104 (e.g., of the terrestrial network) based on a relative position/frequency of the non-terrestrial network's band. As illustrated the size, position, offset, and/or thresholds of the blanking range 1114 may be relatively small or may be eliminated altogether in comparison to the scenario where a lower band is used for the non-terrestrial network (e.g., for communication with client devices 106), for example, in comparison to the example of FIG. 11B.

As illustrated in FIG. 11B, a satellite 142 for a cell/ground node(s) 116 may use a low band 1132 in the spectrum. For example, the diagram 1100*b* may correspond to an implementation where a lower band 1132 is used than in the example of 1100*a*. As illustrated, the diagram may include a portion 1128 of the spectrum available to a non-terrestrial network, while another portion 1126 may be reserved for a terrestrial network. As noted above, a pass band 1130 may be assigned to the terrestrial network. The band 1132 used by a satellite 142 to communicate with client devices 106 may be wholly or partially in the portion 1128. For instance, the block 1132 depicting a band may include out-of-band emissions that overlap with the portion 1126 assigned to the terrestrial network.

As noted in reference to FIG. 11A, a spectrum blanking range 1134 may be used to provide offset between frequency(ies) used for communication between a ground node(s) 116 and a client device 106 and the frequency(ies) for communication between a satellite 142 and a client device 106. The spectrum blanking range 1134 may provide a minimum offset/blanking range and/or may be added to blanking ranges 1124 associated with signal quality indicator values. As illustrated, the spectrum blanking range 1134 may be based on a relative frequency of the band 1132.

Accordingly, the scheduler 108 may decrease the sizes (e.g., threshold frequencies) of assignable spectrum ranges 1122 and increase the sizes of blanking ranges 1124, so that there are fewer channels/frequencies that may be assigned to a client device 106, which may also reduce interference for these cells. For instance, FIG. 11B illustrates a first assignable frequency range 1122*a* and corresponding first blanking range 1124*a* for devices with low-level signal quality indicator values, a second assignable frequency range 1122*b* and corresponding second blanking range 1124*b* for devices with mid-level signal quality indicator values, a third assignable frequency range 1122*c* and corresponding third blanking range 1124*c* for devices with high-level signal quality indicator values. As illustrated, where the band 1132 used by a satellite 142 is lower (potentially, along with its out-of-band emissions overlapping on the pass band 1130 and/or portion 1126 assigned to the terrestrial network), the thresholds at which frequencies/channels may be assigned to client devices 106 may also be lower to reduce interference.

It should be noted that, because more frequencies/channels are available to a terrestrial network when a high band is used by a satellite 142 (e.g., thereby increasing assignable frequency ranges), satellites 142 in high-population areas may be assigned higher bands where possible, as discussed above. Accordingly, a non-terrestrial network operator may rank geographic regions based on population or population density in the regions and then assign lower bands to low-density populated regions and higher frequency bands to high-density populated areas, thereby reducing impact of the non-terrestrial network using portions of the available cellular spectrum.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:

determining one or more frequency bands assigned to one or more adjacent satellite services, the one or more adjacent satellites serving one or more adjacent geographic regions to a reference geographic region served by a reference satellite;

determining one or more interference characteristics of the one or more frequency bands used by the one or more adjacent satellite services;

determining one or more spectrum blanking ranges for the one or more wireless client devices, the one or more spectrum blanking ranges restricting wireless frequencies in the one or more spectrum blanking ranges from being assigned to the one or more wireless client devices for terrestrial wireless communication;

selecting a frequency band for use by the reference satellite in the reference geographic region based on the one or more interference characteristics of the one or more frequency bands assigned to the one or more adjacent satellite services, the selected frequency band being selected from a set of available frequency bands for non-terrestrial wireless communication with one or more wireless client devices; and instructing the reference satellite to use the selected frequency band for communication with the one or more wireless client devices in the reference geographic region.

2. The computer-implemented method of claim 1, further comprising:

determining an arrangement of geographic regions based on a quantity of the set of available frequency bands.

3. The computer-implemented method of claim 1, wherein the one or more interference characteristics include:

a proximity of the one or more frequency bands to the selected frequency band on a spectrum of electromagnetic frequencies.

4. The computer-implemented method of claim 3, wherein the one or more interference characteristics include:

an out of band emission associated with the one or more frequency bands used by the one or more adjacent satellite services.

5. The computer-implemented method of claim 1, further comprising:

determining one or more population densities of the one or more adjacent geographic regions, the one or more population densities reflecting a quantity of wireless client devices in the one or more adjacent geographic regions;

selecting a first frequency band from the one or more frequency bands for a first adjacent geographic region of the one or more adjacent geographic regions based on the one or more population densities; and assigning the first frequency band to a first adjacent satellite of the one or more adjacent satellite services, the first adjacent satellite serving the first adjacent geographic region.

6. The computer-implemented method of claim 1, wherein:

determining the one or more spectrum blanking ranges for the one or more wireless client devices is based on the selected frequency band.

7. The computer-implemented method of claim 1, further comprising:

determining a signal quality indicator value for a first wireless client device in a cell of a terrestrial wireless communication network, the cell being at least partially located in the reference geographic region.

8. The computer-implemented method of claim 7, further comprising:

assigning a wireless communication channel to the first wireless client device by a ground node of a cell in which the first wireless client device is located based on the signal quality indicator value and the selected frequency band.

9. The computer-implemented method of claim 7, further comprising:

determining an assignable spectrum range for the first wireless client device based on the signal quality indicator value and the one or more spectrum blanking ranges; and assigning a wireless communication channel to the first wireless client device using the assignable spectrum range.

10. A system comprising:

one or more processors; and one or more memories storing instructions that, when executed by the one or more processors, cause the system to:

determine one or more frequency bands assigned to one or more adjacent satellites, the one or more adjacent satellites serving one or more adjacent geographic regions to a reference geographic region served by a reference satellite;

determine one or more interference characteristics of the one or more frequency bands used by the one or more adjacent satellites;

determine one or more spectrum blanking ranges for the one or more wireless client devices, the one or more spectrum blanking ranges restricting wireless frequencies in the one or more spectrum blanking ranges from being assigned to the one or more wireless client devices for terrestrial wireless communication;

select a frequency band for use by the reference satellite in the reference geographic region based on the one or more interference characteristics of the one or more frequency bands assigned to the one or more adjacent satellites, the selected frequency band being selected from a set of available frequency bands for non-terrestrial wireless communication with one or more wireless client devices; and instruct the reference satellite to use the selected frequency band for communication with the one or more wireless client devices in the reference geographic region.

11. The system of claim 10, wherein the instructions, when executed by the one or more processors, further cause the system to:

determine an arrangement of geographic regions based on a quantity of the set of available frequency bands.

12. The system of claim 10, wherein the one or more interference characteristics include:

a proximity of the one or more frequency bands to the selected frequency band on a spectrum of electromagnetic frequencies.

13. The system of claim 12, wherein the one or more interference characteristics include:

an out of band emission associated with the one or more frequency bands used by the one or more adjacent satellites.

14. The system of claim 10, wherein the instructions, when executed by the one or more processors, further cause the system to:

determine one or more population densities of the one or more adjacent geographic regions, the one or more population densities reflecting a quantity of wireless client devices in the one or more adjacent geographic regions;

select a first frequency band from the one or more frequency bands for a first adjacent geographic region of the one or more adjacent geographic regions based on the one or more population densities; and assign the first frequency band to a first adjacent satellite of the one or more adjacent satellites, the first adjacent satellite serving the first adjacent geographic region.

15. The system of claim 10, wherein:

determining the one or more spectrum blanking ranges for the one or more wireless client devices is based on the selected frequency band.

16. The system of claim 10, wherein the instructions, when executed by the one or more processors, further cause the system to:

determine a signal quality indicator value for a first wireless client device in a cell of a terrestrial wireless communication network, the cell being at least partially located in the reference geographic region.

17. The system of claim 16, wherein the instructions, when executed by the one or more processors, further cause the system to:

assign a wireless communication channel to the first wireless client device by a ground node of a cell in which the first wireless client device is located based on the signal quality indicator value and the selected frequency band.

18. A computer-implemented method comprising:

determining one or more frequency bands assigned to one or more adjacent satellites, the one or more adjacent satellites serving one or more adjacent geographic regions to a reference geographic region served by a reference satellite, determining the one or more frequency bands;

selecting a frequency band for use by the reference satellite in the reference geographic region based on the one or more frequency bands assigned to the one or more adjacent satellites, the selected frequency band being selected from a set of available frequency bands for non-terrestrial wireless communication with one or more wireless client devices;

instructing the reference satellite to use the selected frequency band for communication with the one or more wireless client devices in the reference geographic region;

determining a spectrum blanking range for a wireless client device based on the selected frequency band, the spectrum blanking range restricting wireless frequencies in the spectrum blanking range from being assigned to the wireless client device for terrestrial wireless communication; and assigning a wireless communication channel to the wireless client device by a ground node of a cell in which the wireless client device is located based on a signal quality indicator value and the selected frequency band.

* * * * *